(12) United States Patent
Bahr

(10) Patent No.: US 7,882,110 B2
(45) Date of Patent: Feb. 1, 2011

(54) METHOD AND SYSTEM FOR MIGRATING DOCUMENTS

(75) Inventor: Ernest F. Bahr, Houston, TX (US)

(73) Assignee: Enterprise Content Management Group, Houston, TX (US)

(*) Notice: Subject to any disclaimer, the term of this patent is extended or adjusted under 35 U.S.C. 154(b) by 448 days.

(21) Appl. No.: 12/113,147

(22) Filed: Apr. 30, 2008

(65) Prior Publication Data

US 2009/0327326 A1 Dec. 31, 2009

(51) Int. Cl.
*G06F 7/00* (2006.01)
(52) U.S. Cl. ............... 707/741; 707/805; 707/999.102; 715/229; 715/230
(58) Field of Classification Search ................ None
See application file for complete search history.

(56) References Cited

U.S. PATENT DOCUMENTS 6,370,553 B1 * 4/2002 Edwards et al. ............ 715/234

2002/0184188 A1 * 12/2002 Mandyam et al. ............ 707/1
2005/0278639 A1 * 12/2005 Becker ...................... 715/741
2006/0235855 A1 * 10/2006 Rousseau et al. ........... 707/100

* cited by examiner

Primary Examiner—Don Wong
Assistant Examiner—Shyue Jiunn Hwa
(74) Attorney, Agent, or Firm—Osha • Liang LLP

(57) ABSTRACT

A method for exporting native source documents (NSDs) from a document repository. The method includes identifying a first NSD to export, where the first NSD includes a first version of content and first metadata, and identifying a second NSD to export, where the second NSD comprises a second version of the content and second metadata. The method further includes generating a source content definition file (CDF) document that includes a global property, a first version-specific property for the first version of the content, a reference to the first version of the content, a second version specific-property for the second version of the content, and a reference to the second version of the content. The method further includes storing the source CDF document in a persistent storage device.

17 Claims, 18 Drawing Sheets

Content Transformation File 346

CTF Attributes 348

Exclusion(s) 350

Action(s) 352

Figure 3G ecmg

Validation Result Set

Summary:

All Test Passed

| Successes | Failures | Total |
|---|---|---|
| 340 | 0 | 340 |

All failures:

| Passed | Failed | Details |
|---|---|---|

All Test Results:

| Passed | Failed | Details |
|---|---|---|
| 7 | 0 | I:\EBohn\Tax_DM_Migration\Validations\Details\AccountingType\Successes\003678630_Details.trs |
| 7 | 0 | I:\EBohn\Tax_DM_Migration\Validations\Details\AccountingType\Successes\003678632_Details.trs |
| 7 | 0 | I:\EBohn\Tax_DM_Migration\Validations\Details\AccountingType\Successes\003678633_Details.trs |
| 7 | 0 | I:\EBohn\Tax_DM_Migration\Validations\Details\AccountingType\Successes\003678634_Details.trs |
| 7 | 0 | I:\EBohn\Tax_DM_Migration\Validations\Details\AccountingType\Successes\003678635_Details.trs |
| 7 | 0 | I:\EBohn\Tax_DM_Migration\Validations\Details\AccountingType\Successes\003678636_Details.trs |
| 7 | 0 | I:\EBohn\Tax_DM_Migration\Validations\Details\AccountingType\Successes\003678638_Details.trs |
| 7 | 0 | I:\EBohn\Tax_DM_Migration\Validations\Details\AccountingType\Successes\003678639_Details.trs |
| 7 | 0 | I:\EBohn\Tax_DM_Migration\Validations\Details\AccountingType\Successes\003678640_Details.trs |
| 7 | 0 | I:\EBohn\Tax_DM_Migration\Validations\Details\AccountingType\Successes\003678641_Details.trs |
| 7 | 0 | I:\EBohn\Tax_DM_Migration\Validations\Details\AccountingType\Successes\003678642_Details.trs |
| 7 | 0 | I:\EBohn\Tax_DM_Migration\Validations\Details\AccountingType\Successes\003678643_Details.trs |
| 7 | 0 | I:\EBohn\Tax_DM_Migration\Validations\Details\AccountingType\Successes\003678648_Details.trs |
| 7 | 0 | I:\EBohn\Tax_DM_Migration\Validations\Details\AccountingType\Successes\003678649_Details.trs |
| 7 | 0 | I:\EBohn\Tax_DM_Migration\Validations\Details\AccountingType\Successes\003678650_Details.trs |
| 7 | 0 | I:\EBohn\Tax_DM_Migration\Validations\Details\AccountingType\Successes\003678652_Details.trs |
| 7 | 0 | I:\EBohn\Tax_DM_Migration\Validations\Details\AccountingType\Successes\003678653_Details.trs |
| 7 | 0 | I:\EBohn\Tax_DM_Migration\Validations\Details\AccountingType\Successes\003678655_Details.trs |

*FIG. 11*

METHOD AND SYSTEM FOR MIGRATING DOCUMENTS

BACKGROUND

Companies use information management infrastructures to store and manage the companies' data. Specifically, companies may implement one or more content management systems to store and manage specific types of content. For example, a company may implement Microsoft® Outlook® to store and manage electronic mail for all individuals in the company and Documentum® to manage other electronic files (e.g., text documents, image files, spreadsheets, multimedia files, etc.). (Microsoft and Outlook are registered trademarks of the Microsoft Corporation in Redmond, Wash.; Documentum is a registered trademark of the EMC Corporation in Hopkinton, Mass.).

Each of the aforementioned content management systems store content (i.e., files) as well as associated metadata. The metadata may be obtained from the file, obtained from another source, and/or manually input by a user into the content management system. The information stored in the metadata as well as the manner in which the information is stored in the metadata is defined by the content management system.

Custom applications are typically developed to migrate the content between two content management systems. The custom applications are typically designed for the specific migration and must be re-coded in order to be used to perform another migration. As an alternative, documents may be migrated between content management systems in an ad hoc manner.

SUMMARY

In general, in one aspect, the invention relates to a method for exporting native source documents (NSDs) from a document repository. The method includes identifying a first NSD to export, wherein the first NSD comprises a first version of content and first metadata, identifying a second NSD to export, wherein the second NSD comprises a second version of the content and second metadata, generating a source content definition file (CDF) document comprising a global property, wherein the global property is present in the first metadata, a first version-specific property for the first version of the content, wherein the first version-specific property is obtained from the first metadata, a reference to the first version of the content, a second version specific-property for the second version of the content, wherein the second version-specific property is obtained from the second metadata, and a reference to the second version of the content, and storing the source CDF document in a persistent storage device.

In general, in one aspect, the invention relates to a method for exporting a native source documents (NSDs) from a document repository. The method includes identifying an NSD to export, wherein the NSD comprises a first version of content, a second version of content, and metadata, generating a source content definition file (CDF) document comprising a global property, wherein the global property is present in the metadata, a first version-specific property for the first version of the content, wherein the first version-specific property is obtained from the metadata, a reference to the first version of the content, a second version-specific property for the second version of the content, wherein the second version-specific property is obtained from the metadata, and a reference to the second version of the content, and storing the source CDF document in a persistent storage device.

In general, in one aspect, the invention relates to a method for exporting native source documents (NSDs) from a document repository. The method includes identifying a first NSD to export, wherein the first NSD comprises a first version of content and first metadata, identifying a second NSD to export, wherein the second NSD comprises a second version of the content and second metadata, generating a source content definition file (CDF) document comprising a global property, wherein the global property is present in the first metadata, a first version-specific property for the first version of the content, wherein the first version-specific property is obtained from the first metadata, an encoded version of the first version of the content, a second version property for the second version of the content, wherein the second version-specific property is obtained from the second metadata, and an encoded version of the second version of the content, and storing the source CDF document in a persistent storage device.

In general, in one aspect, the invention relates to a method for exporting a native source documents (NSDs) from a document repository. The method includes identifying a NSD to export, wherein the NSD comprises a first version of content, a second version of content, and metadata, generating a source content definition file (CDF) document comprising a global property, wherein the global property is present in the metadata, a first version-specific property for the first version of the content, wherein the first version-specific property is obtained from the metadata, an encoded version of the first version of the content, a second version-specific property for the second version of the content, wherein the second version-specific property is obtained from the metadata, and an encoded version of the second version of the content, and storing the source CDF document in a persistent storage device.

In general, in one aspect, the invention relates to a method for migrating native source documents (NSDs) from a first document repository to a second document repository. The method includes identifying a first NSD to export, wherein the first NSD comprises a first version of content and first metadata, identifying a second NSD to export, wherein the second NSD comprises a second version of the content and second metadata, generating a source CDF document, wherein the source CDF document comprises a global property, wherein the global property is present in the first metadata, a first version-specific property for the first version of the content, wherein the first version-specific property is obtained from the first metadata, an encoded version of the first version of the content, a second version-specific property for the second version of the content, wherein the second version-specific property is obtained from the second metadata, and an encoded version of the second version of the content, storing the source CDF document in a persistent storage device, obtaining a content transformation file (CTF) defining how to transform the source CDF document into a target CDF document, transforming the source CDF document into a target CDF document using the CTF, and generating a first native target document (NTD) comprising the first version of the content from the target CDF file, generating a second native target document (NTD) comprising the second version of the content from the target CDF file, storing the first NTD in the second document repository, and storing the second NTD in the second document repository.

In general, in one aspect, the invention relates to a method for migrating native source documents (NSDs) from a first document repository to a second document repository. The method includes identifying a first NSD to export, wherein the first NSD comprises a first version of content and first metadata, identifying a second NSD to export, wherein the second NSD comprises a second version of the content and second metadata, generating a source CDF document, wherein the source CDF document comprises a global property, wherein the global property is present in the first metadata, a first version-specific property for the first version of the content, wherein the first version-specific property is obtained from the first metadata, a reference to the first version of the content, a second version-specific property for the second version of the content, wherein the second version-specific property is obtained from the second metadata, and a reference to the second version of the content, storing the source CDF document in a persistent storage device, obtaining a content transformation file (CTF) defining how to transform the source CDF document into a target CDF, transforming the source CDF document into a target CDF document using the CTF, and generating a first native target document (NTD) comprising the first version of the content from the target CDF file, generating a second native target document (NTD) comprising the second version of the content from the target CDF file, storing the first NTD in the second document repository, and storing the second NTD in the second document repository.

In general, in one aspect, the invention relates to a method for migrating a native source document (NSD) from a first document repository to a second document repository. The method includes identifying the NSD to export, wherein the NSD comprises a first version of content, a second version of the content, and metadata, generating a source CDF document, wherein the source CDF document comprises a global property, wherein the global property is present in the metadata, a first version-specific property for the first version of the content, wherein the first version-specific property is obtained from the metadata, a reference to the first version of the content, a second version-specific property for the second version of the content, wherein the second version-specific property is obtained from the metadata, and a reference to the second version of the content, storing the source CDF document in a persistent storage device, obtaining a content transformation file (CTF) defining how to transform the source CDF document into a target CDF, transforming the source CDF document into a target CDF document using the CTF, and generating a first native target document (NTD) comprising the first version of the content from the target CDF file, generating a second native target document (NTD) comprising the second version of the content from the target CDF file, storing the first NTD in the second document repository, and storing the second NTD in the second document repository.

In general, in one aspect, the invention relates to a method for migrating a native source document (NSD) from a first document repository to a second document repository. The method includes identifying the NSD to export, wherein the NSD comprises a first version of content, a second version of the content, and metadata, generating a source CDF document, wherein the source CDF document comprises, a global property, wherein the global property is present in the metadata, a first version-specific property for the first version of the content, wherein the first version-specific property is obtained from the metadata, an encoded version of the first version of the content, a second version-specific property for the second version of the content, wherein the second version-specific property is obtained from the metadata, and an encoded version of the second version of the content, storing the source CDF document in a persistent storage device, obtaining a content transformation file (CTF) defining how to transform the source CDF document into a target CDF, transforming the source CDF document into a target CDF document using the CTF, and generating a first native target document (NTD) comprising the first version of the content from the target CDF file, generating a second native target document (NTD) comprising the second version of the content from the target CDF file, storing the first NTD in the second document repository, and storing the second NTD in the second document repository.

Other aspects of the invention will be apparent from the following description and the appended claims.

BRIEF DESCRIPTION OF DRAWINGS

FIGS. 3A-3J show data structures in accordance with one embodiment of the invention.

FIGS. 7-16 show an example in accordance with one embodiment of the invention.

DETAILED DESCRIPTION

Figure 1:
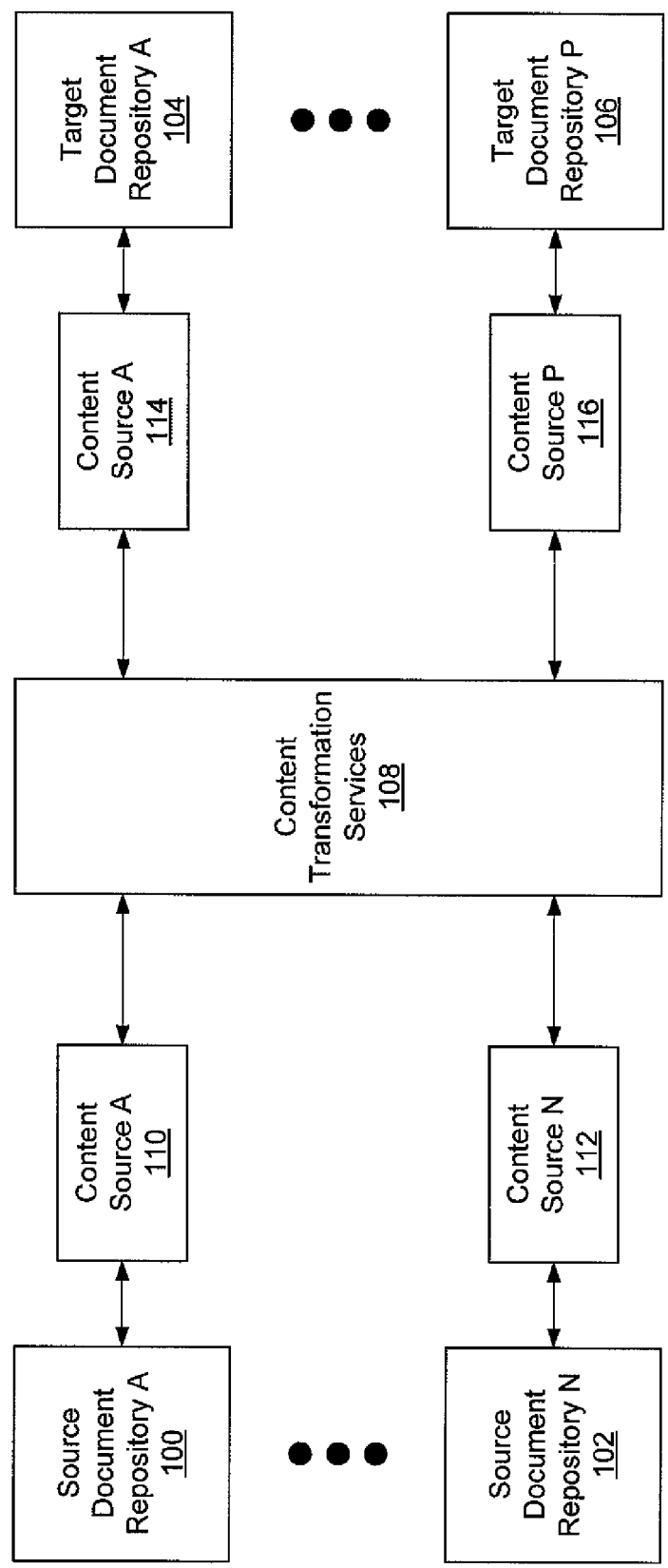
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for migrating documents. More specifically, embodiments of the invention define a content definition file (CDF) format to enable synchronous and asynchronous migration of documents between content management systems. Further, embodiments of the invention provide content transformation services (CTS) which supports exporting documents from a content management system and storing the exported documents in CDF format (hereafter "CDF documents"). Further, the CTS supports transforming CDF documents using content transformation files (CTFs) and importing the transformed CDF documents into a content management system.

FIG. 1 shows a system in accordance with one embodiment of the invention. The system includes one or more document repositories (100, 102, 104, 106) and a content transformation system (CTS) (108). The document repositories (100, 102, 104, 106) interact with the CTS (108) using one or more content sources (110, 112, 114, 116). Each of the aforementioned components in the system is discussed below.

In one embodiment of the invention, a document repository (100, 102, 104, 106) corresponds to a persistent storage device (i.e., any device (or group of devices) capable of storing documents (i.e., Native Source Document and Native Target Documents (discussed below)). Examples of persistent storage devices include, but are not limited to, a hard disk drive, or any manner of removable media including but not limited to compact disk (CD), digital versatile disk (DVD), universal serial bus (USB) attached storage, flash memory, or any other medium for storing digital media.

In one embodiment of the invention, a document includes content and metadata. For example, if the document is a Microsoft® Word® file named "car_parts.doc" which included a listing of car parts, the content is the listing of car parts and the metadata includes information such as: owner of the document, date the document was created, date the content was modified, size of the document, etc. In addition, a given document repository may include multiple versions of a given piece of content. Continuing with the above example, the document repository may include two versions of car_parts.doc, where the first version car_parts.doc includes the listing of car parts made on Jan. 1, 2008 and the second version of car_parts.doc includes an updated listing of car parts made on Feb. 1, 2008. Each of the aforementioned versions is stored in a separate document within the document repository. Further, each document is associated with metadata that is used by the content management system (CMS) (discussed below) to reflect that the one document includes the first version of the car_parts.doc and that another document includes the second version of the car_parts.doc.

Continuing with the discussion in FIG. 1, though not shown in FIG. 1, each document repository is associated with one or more CMSs. Each CMSs corresponds to a software application configured to store and manage data in a document repository. Examples of content management systems include, but are not limited to, a file system, a spreadsheet, Microsoft® Outlook®, FileNet® Content Services, and Documentum®. (FileNet is a registered trademark of the IBM Corporation). The management functionality varies based on the CMS. For example, if the CMS is a spreadsheet then the management functionality may be limited to operations which may be performed on data within the spreadsheet. In another example, if the CMS is FileNet® Content Services then the management functionality may include associating each document in the document repository with a document number, providing functionality for a user to specify metadata each document, tracking multiple versions of content, etc.

In one embodiment of the invention, the CTS (108) is configured to enable the migration of documents from one document repository to another document repository. More specifically, the CTS (108) is configured to obtain native source documents (NSD) from a source document repository, generate corresponding source CDF documents, apply a transformation to the source CDF documents to obtain target CDF documents, and provide the target CDF documents to a target document repository. In addition, the CTS (108) includes functionality to log the migration of documents and validate the transformation to be applied to the source CDF documents prior to commencing the migration process. Further, the CTS (108) includes functionality to store source and/or target CDF documents in persistent storage devices (not shown). The aforementioned functionality is discussed in detail below.

In one embodiment of the invention, the CTS (108) interfaces with the document repositories (100, 102, 104, 106) using content sources (110, 112, 114, 116). In one embodiment of the invention, each content source is configured to provide an interface between a document repository and the CTS. Each content source may implement one or more of the following: (i) export functionality—functionality to export native source documents from a source document repository to create source CDF documents; (ii) import functionality—functionality to import native target documents in to a target document repository; (iii) classification functionality—functionality to gather taxonomy information (i.e., information about the metadata model for the document repository) from the document repository in order to generate a document repository information file (discussed below) for the repository; (iv) explorer functionality—functionality to browse and display information for the repository, where the information is provided to the CTS to display to a user via a graphical user interface (GUI) not shown; (v) basic content services—functionality to perform one or more services of the CMS executing on the document repository (e.g., add documents, delete documents, check-in documents, check-out documents, modify document metadata, etc.); and (vi) records management functionality—to utilize functionality of the CMS executing on the document repository to declare one or more documents as records in the document repository.

Figure 2:
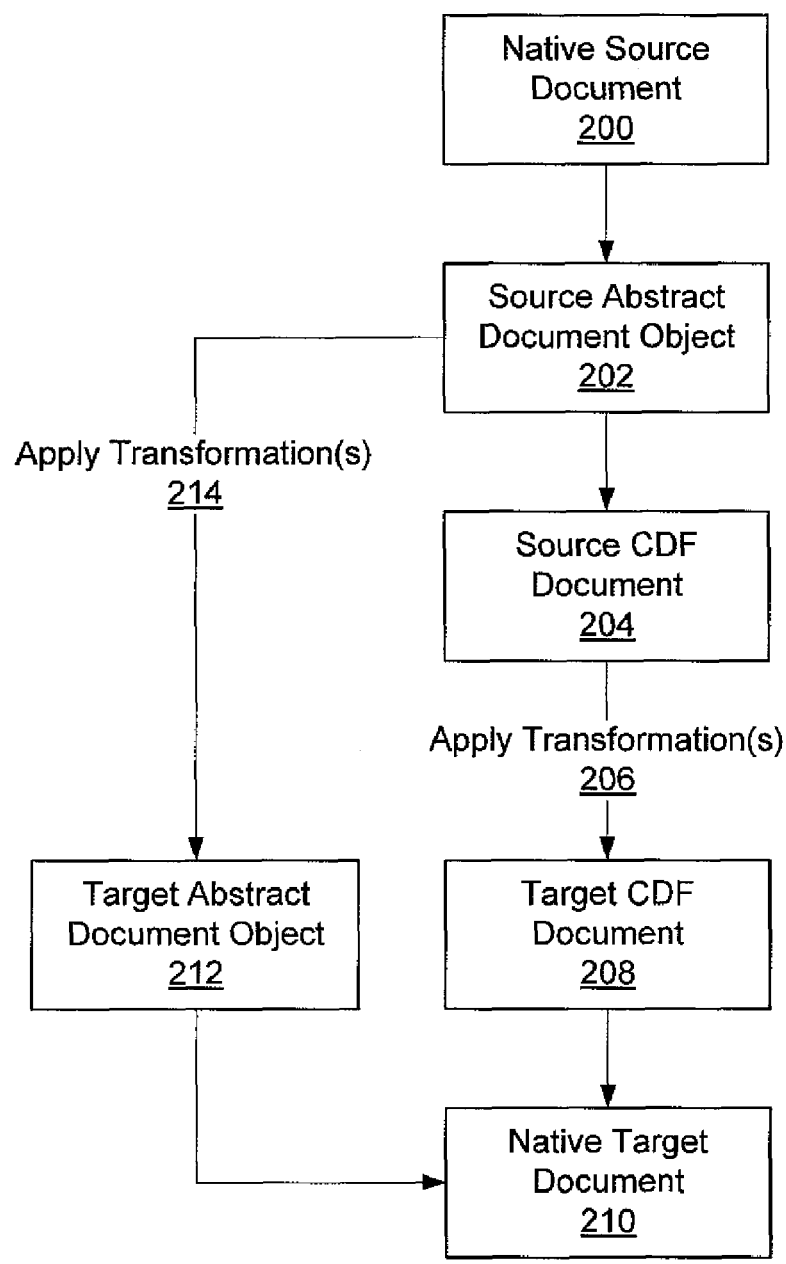
FIG. 2 shows a flow diagram in accordance with one embodiment of the invention.

FIG. 2 shows a flow diagram in accordance with one embodiment of the invention. More specifically, FIG. 2 shows the different forms a document may take as it is migrated from a source repository to a target repository. Initially, the document is located in a source repository and is referred to as a native source document (NSD) (200). In one embodiment of the invention, the NSD includes content and metadata. The content may be stored in any file format (e.g., content with the following extensions .doc, .msg, .xls, .ppt, .pdf, etc.) supported by the CMS used to store and manage documents on the source content repository. The metadata may include any properties (or attributes) of and/or associated with the content which are supported by the CMS. The properties, including name and corresponding data type (e.g., Boolean, integer, string, real number, etc.), as well as the organization of the metadata is specified by the CMS. In one embodiment of the invention, there is an NSD for each version of content. For example, if there are five versions of a file in the source document repository, then the repository would include five NSDs where each NSD includes one version of the file and the corresponding metadata.

In another embodiment of the invention, the NSD includes all versions of content and the associated metadata. For example, if there are five versions of a file in the source document repository, then the repository would include one NSD where the NSD includes all versions of the file and the corresponding metadata.

When an NSD (200) is exported from the source document repository, the NSD (200) is represented as an in-memory tree referred to as a source abstract document object (SADO) (202). The SADO (202) corresponds to the in-memory representation of the source CDF document (204). Further, the SADO (202) includes (i) a reference to each version of the content or each version of the content and (ii) the metadata (described below) associated with each NSD for the content included or referenced in (i). Said another way, the SADO (202) includes metadata and corresponding versions for a given piece of content. Continuing with the above example, the SADO (202) may include references to each of the five versions of the file along with the corresponding metadata for each version of the file.

In one embodiment of the invention, the source CDF document (204) is obtained by serializing the SADO (202). In one embodiment of the invention, the source CDF document (204) is an Extensible Language Mark-up (XML) document. In one embodiment of the invention, the target CDF document (208) is obtained by applying one or more transformations (206) (discussed below) to the source CDF document. In one embodiment of the invention, the target CDF document (208) is an Extensible Language Mark-up (XML) document.

In one embodiment of the invention, the target CDF document (208) is used to generate one or more native target documents (NTD) (similar to NSDs but located in the target repository). In one embodiment of the invention, one NTD (210) is created for each version of the content included in the target CDF document (208). Continuing with the above example, if the target CDF document includes each of the five versions of the content and the corresponding metadata, then five NTD (210) are created in the target repository where each NTD (210) includes one of the versions of the content and the associated metadata.

In one embodiment of the invention, the source CDF documents (204) and the target CDF documents (208) are used for asynchronous migration of data from a source document repository to a target document repository. In another embodiment of the invention, the migration may be performed synchronously (i.e., the CTS is simultaneously connected to both the source document repository and the target document repository). In such cases, transformations (214) may be applied to the SADO (202) to obtain a target abstract document object (TADO) (212). The TADO corresponds to the in-memory representation of the target CDF document (208). The TADO (212) may be used to generate the appropriate NTDs (210).

Figure 3A:
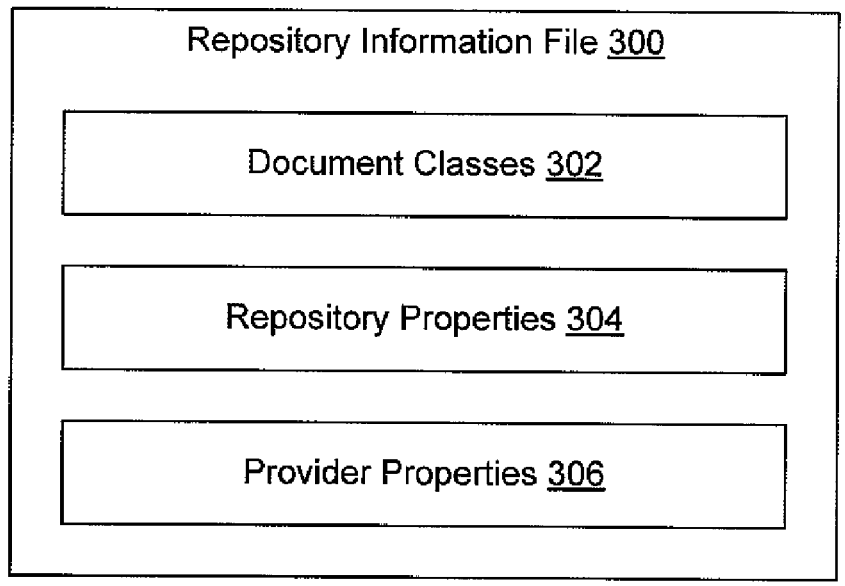

FIGS. 3A-3I show data structures in accordance with one embodiment of the invention. Turning to FIG. 3A, FIG. 3A shows a repository information file (RIF) (300) in accordance with one embodiment of the invention. The RIF (300) defines the document repository. In one embodiment of the invention, each RIF (300) may include one or more of the following: (i) document classes (302); (ii) repository properties (304); and (iii) provider properties (306).

In one embodiment of the invention, the document classes (302) define the document classes in the document repository. Each document class within the document classes (302) is defined using one or more of the following: (i) ID—the identifier for the document class as specified by the underlying document repository; (ii) label—the descriptive identifier for the document class; (iii) Name—the name of the document class; (iv) ParentIdentifier—if the DocumentClass is a child class then the parent identifier would refer to the parent class to which this DocumentClass is inherited; and (v) properties—the document properties associated with the document class.

In one embodiment of the invention, the properties may include one or more of the following: (i) Cardinality—defines the cardinality of property as either single-valued or multi-valued; (ii) DefaultValue—the default value to be assigned to the property for a given object instance; (iii) HasValue—Specifies whether or not the property currently has a value assigned; (iv) ID—the ID of the property; (v) IsHidden—specifies whether or not this property is hidden in this document class; (vi) IsInherited—determines whether or not this property association to the document class is inherited from a parent document class; (vii) IsRequired—specifies whether or not this property is required for the associated document class; (viii) IsSystemProperty—specifies whether this property is system defined or customer defined; (ix) Name—the name of the property; (x) PackedName—returns the property name without any spaces; (xi) Searchable—specifies whether or not this property may be used as a search criteria; (xii) Selectable—specifies whether or not this property may be returned as a result column in a search; (xiii) SubscribedClasses—lists all of the document classes to which this property is associated; (xiv) Type—defines the data type of the value to be stored for the property; (xv) Value—the actual value assigned to the property, if the cardinality is set as single-valued; and (xvi) Values—the collection of values assigned to the property, if the cardinality is set as multi-valued.

In one embodiment of the invention, the repository properties (304) may include one or more of the following: (i) ContentSource—the content source instance used when connecting to the document repository; (ii) DocumentClasses—the collection of document classes defined in the document repository; (iii) Name—the name of the document repository; (vi) Properties—the complete set of properties defined metadata model for the document repository; and (v) Provider—the provider used by the content source when connecting to the document repository.

In one embodiment provider properties (306) may include one or more of the following: (i) Name—name of the provider; (ii) Type—the type of the provider; (iii) the name of the company which created the CMS used to store and manage documents in the document repository; (iv) the name of the CMS (i.e., the name of the CMS application); and (v) the version of the CMS. In one embodiment of the invention, a provider corresponds to source code which includes one or more methods to enable interaction between a document repository and the CTS. When the provider is instantiated it is referred to as a content source.

Returning to the discussion of FIG. 3A, in one embodiment of the invention, the RIF is an XML file. The following is an example of a RIF in accordance with one embodiment of the invention. This example is not intended to limit the scope of the invention.

EXAMPLE 1

Repository Information File

```
<?xml version="1.0" encoding="utf-8"?>
<Repository xmlns:xsi="http://www.w3.org/2001/XMLSchema-instance"
xmlns:xsd="http://www.w3.org/2001/XMLSchema">
    <Name>Tax DM - ACME CS</Name>
    <ProviderSystem>
        <Name>Panagon Provider</Name>
        <Type>FileNet Panagon</Type>
        <Company>FileNet Corporation</Company>
        <ProductName>Content Services</ProductName>
        <ProductVersion>5.4</ProductVersion>
    </ProviderSystem>
    <ContentSource Name="Tax DM - ACME CS">
        <ProviderName>Panagon Provider</ProviderName>
        <Properties>
            <ProviderProperty>
                <PropertyName>Name</PropertyName>
                <PropertyValue xsi:type="xsd:string">Tax DM -
                ACME CS</PropertyValue>
            </ProviderProperty>
            [...]
    </ContentSource>
    <DocumentClasses>
        <DocumentClass>
            <ID>{B28663C1-C39C-11CF-B1FF-0020AF398F15}</ID>
            <Label>Accounting Type</Label>
            <Name>Accounting Type</Name>
            <Properties>
                <ClassificationProperty ID="idmDocCustom26">
                    <Type>ecmString</Type>
                    <Cardinality>ecmSingleValued</Cardinality>
                    <PropertyScope>DocumentProperty</PropertyScope>
                    <Name>Accounting Type</Name>
                    <Value xsi:type="xsd:string" />
                    <Values />
                    <IsInherited>false</IsInherited>
                    <IsRequired>false</IsRequired>
                    <IsHidden>false</IsHidden>
                    <IsSystemProperty>false</IsSystemProperty>
                    <Searchable>true</Searchable>
                    <Selectable>true</Selectable>
                    <SubscribedClasses />
                </ClassificationProperty>
```

```
            [...]
        </DocumentClass>
            [...]
    </DocumentClasses>
    <Properties>
        <ClassificationProperty ID="idmId">
            <Type>ecmLong</Type>
            <Cardinality>ecmSingleValued</Cardinality>
            <PropertyScope>DocumentProperty</PropertyScope>
            <Name>Item ID</Name>
            <Value xsi:type="xsd:string" />
            <Values />
            <IsInherited>false</IsInherited>
            <IsRequired>false</IsRequired>
            <IsHidden>false</IsHidden>
            <IsSystemProperty>false</IsSystemProperty>
            <Searchable>true</Searchable>
            <Selectable>true</Selectable>
            <SubscribedClasses>
                <string>General</string>
                <string>Workflow Definition</string>
            </SubscribedClasses>
        </ClassificationProperty>
        [...]
    </Properties>
</Repository>
```

Figure 3B:
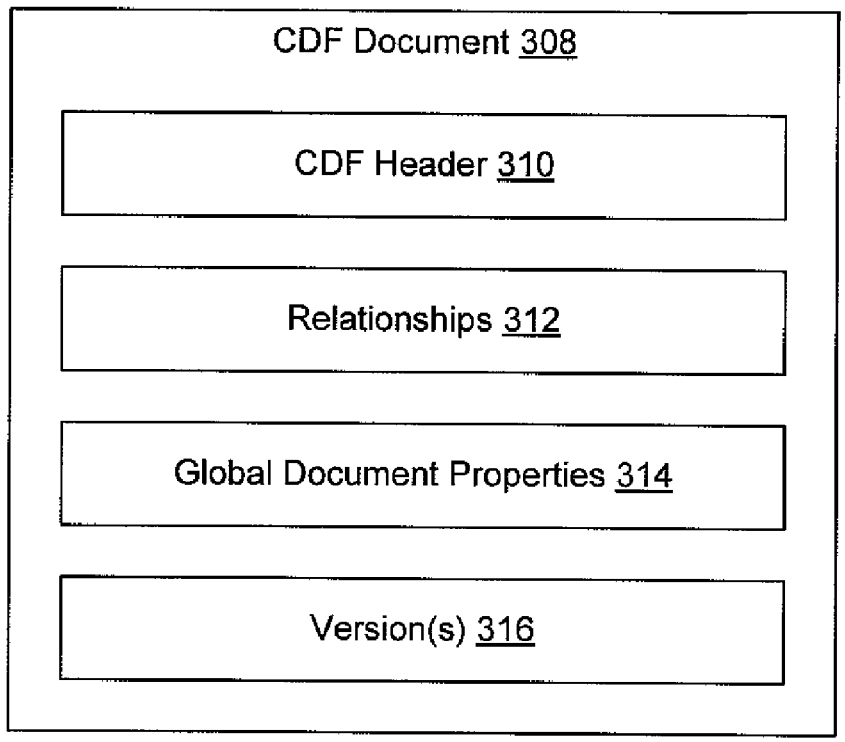

FIG. 3B shows a CDF document (308) in accordance one embodiment of the invention. In one embodiment of the invention, the CDF document (308) may include one or more of the following: (i) a CDF header (310), (ii) relationships (312), (iii) global document properties (314), and (iv) one or more versions (316). Each of the aforementioned components is described below.

In one embodiment of the invention, the CDF header (310) is used to secure the CDF document. One embodiment of the CDF header is described in FIGS. 3F and 3G. In one embodiment of the invention, the relationships (312) defines one or more relationships between two or more documents in a document repository. The relationships (312) are defined using one or more of the following: (i) document—the object specified for the relationship; (ii) ObjectID—the unique identifier of the document or object to which the relationship belongs; (iii) order—gets or sets the order in which this relationship is ranked in the Relationships collection; (iv) Persistence—defines the spanning nature of a document relationship; (v) strength—defines the strength of a document relationship; and (vi) type—defines hierarchy in a parent/child document relationship.

In one embodiment of the invention, the relationship defines a logical relationship between two documents in the document repository. For example, one document may be the overall design specification for an engineering project and another document may include the detailed design specification of a given component in the engineering project. The relationship(s) (312) section preserves this logical relationship. Those skilled in the art will appreciate that each of the aforementioned documents may include multiple versions of content.

In one embodiment of the invention, the relationships may be defined on a per-document basis (in scenarios in which a document includes multiple versions). Alternatively, the relationships may be defined on a per-content version basis. In one embodiment of the invention, the relationship may also be dynamically defined to associate with, for example, the most recent version of content.

In one embodiment of the invention, the global document properties (314) correspond to metadata associated with the CDF document (308) as well as metadata common to one or more NSDs, where each NSD includes one of the versions of the content. The global document properties (314) may include one or more of the following: (i) ContentSource—used to perform repository operations on the CDF document; (ii) CTS_Version—the version of Content Transformation Services used in the original creation or export of the CDF document; (iii) CurrentPath—the path the CDF document was de-serialized from; (iv) DocumentClass—gets or sets the class of CDF document to which this document belongs; (v) DocumentPath—gets the folder location the CDF document was serialized to; (vi) FolderPathArray—returns the array of folders for the specified PathFactory; (vii) FolderPaths—gets the collection of folder names in which an NSD with a version of the content is filed; (viii) ID—the ID of the CDF document; (ix) Name—the name of the CDF document; (x) ObjectID—the object identifier for the CDF document as assigned to the NTD during an import operation; (xi) Properties—gets or sets the collection of properties for the CDF document; (xii) SerializationPath—the path the CDF document was serialized to; and (xiii) StorageType—gets or sets the type of storage associated with the CDF document.

In one embodiment of the invention, each of the versions of a given piece of content are described in the version(s) (316) section of the CDF document. In one embodiment of the invention, the version(s) (316) sections reference the version(s) of content (see FIG. 3C). In another embodiment of the invention, the version(s) (316) sections include the version(s) of content (see FIG. 3D). In one embodiment of the invention, the CDF document may only include version (316) sections for a subset of versions of content as opposed to include a version (316) section for all of the versions of content.

Figure 3C:
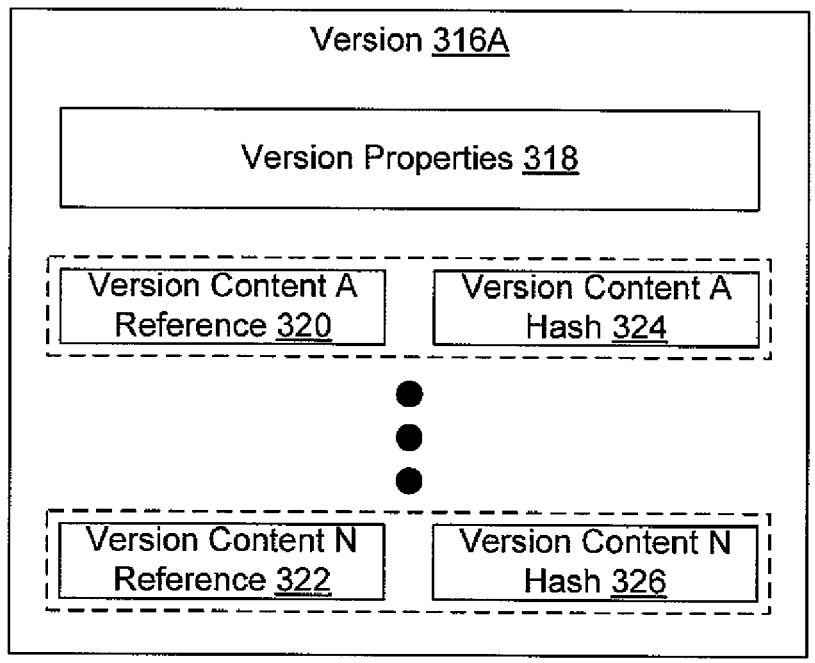

FIG. 3C shows a version (316A) section in accordance with one embodiment of the invention. The version (316A) includes one or more of the following for each version of content in the document repository: (i) version properties (318)—one or more version-specific properties; (ii) version content references (320, 322)—a file path or another mechanism for referencing the corresponding version of the content; (iii) version content hash (324, 326)—the result of applying a hash function (e.g., SHA 256, MD5, SHA-1, etc.) to the version of the content. In one embodiment of the invention, the hash is encoded using, for example, base 64 encoding, prior to being stored in the version content hash (324, 326) section.

In one embodiment of the invention, the version properties (318) may include or more of the following: (i) Cardinality—defines the cardinality of a version-specific property, this is expressed as either single-valued or multi-valued; (ii) DefaultValue—the default value to be assigned to the version-specific property; (iii) HasValue—specifies whether or not the version-specific property currently has a value assigned; (iv) ID—the ID of the version-specific property; (v) Name—the name of the version-specific property; (vi) PackedName—returns the version-specific property name without any spaces; (vii) Type—defines the data type of the value to be stored in the version-specific property; (viii) Value—the actual value assigned to the version-specific property, if the cardinality is set as single-valued; and (ix) Values—the collection of values assigned to the version-specific property, if the cardinality is set as multi-valued.

Figure 3D:
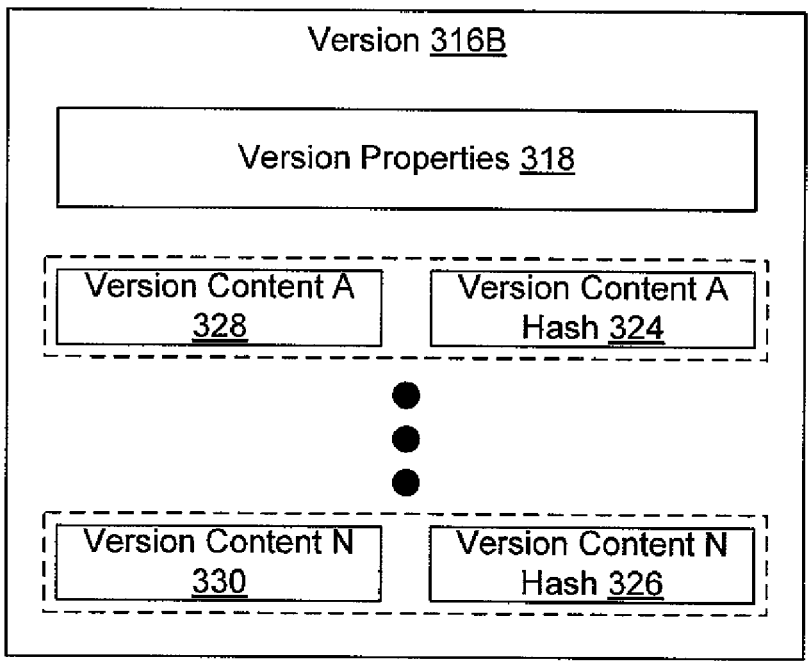

FIG. 3D shows a version (316B) section in accordance with one embodiment of the invention. The version (316B) includes one or more of the following for each version of content in the document repository: (i) version properties (318)—one or more version-specific properties (discussed above); (ii) version content (328, 330)—the version of the content; (iii) version content hash (324, 326)—the result of applying a hash function (e.g., SHA 256, MD5, SHA-1, etc.) to the version of the content. In one embodiment of the invention, the version of the content is encoded using, for example, base 64 encoding, prior to being stored in the version content (328, 330) section. In one embodiment of the invention, the version of the content is compressed and then encoded using, for example, base 64 encoding, prior to being stored in the version content (328, 330) section. In one embodiment of the invention, the hash is encoded using, for example, base 64 encoding, prior to being stored in the version content hash (324, 326) section.

In one embodiment of the invention, the version (316) section in the CDF document (308) may include version content references (as described in FIG. 3C), content versions (as described in FIG. 3D), and any combination thereof.

Figure 3E:
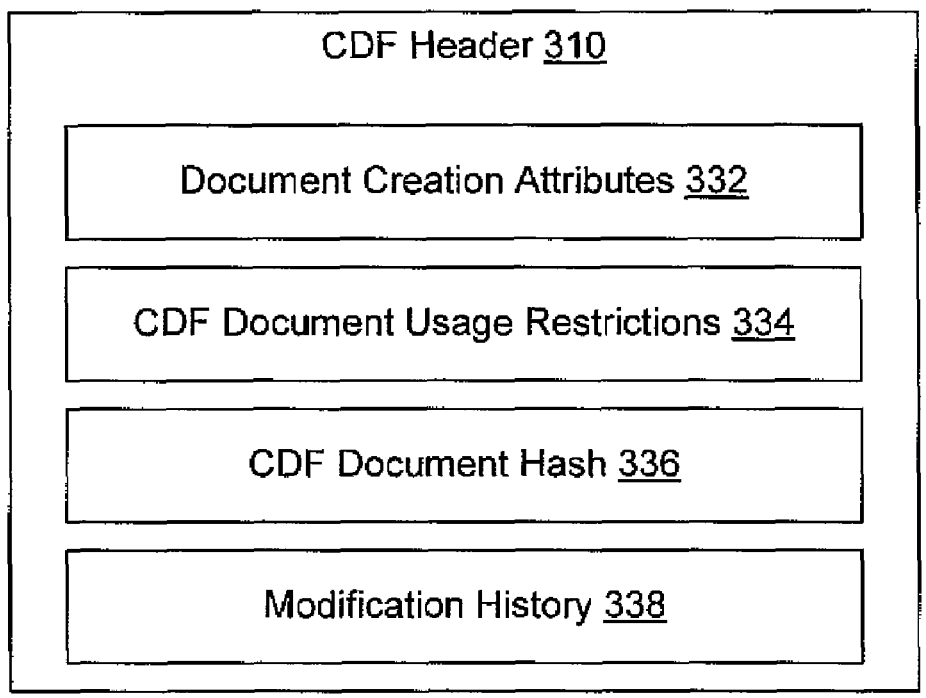

FIG. 3E shows a CDF header (310) in accordance with one embodiment of the invention. The CDF header (310) may include or more of the following: (i) document creation attributes (332); (ii) CDF document usage restrictions (334); (iii) CDF document hash (336); and modification(s) (338). In one embodiment of the invention, document creation attributes may include or more of the following: (i) CDF document ID; (ii) CTS version used to create CDF document; (iii) serialization path—the file path for the serialized version of the CDF document; (iv) generation date of the CDF document; (v) workstation used to generate the CDF document; (vi) user ID of the user which created the CDF document; and (vii) content source properties which define the content source.

In one embodiment of the invention, the CDF document usage restrictions (334) define the usage restrictions for the CDF document (308). The CDF document usage restrictions (334) may restrict usage based on any level of granularity. In one embodiment of the invention, the CDF document hash (336) is generated by applying a hash function to a serialized version (e.g., XML version) of the CDF document (308) excluding the CDF header (310). The resulting hash is then encoded, for example, using base 64 encoding, prior to be added to the CDF document hash (336) section. In one embodiment of the invention, modification(s) (338) section tracks actions performed on the CDF document (308) after creation of the CDF header (310).

Figure 3F:
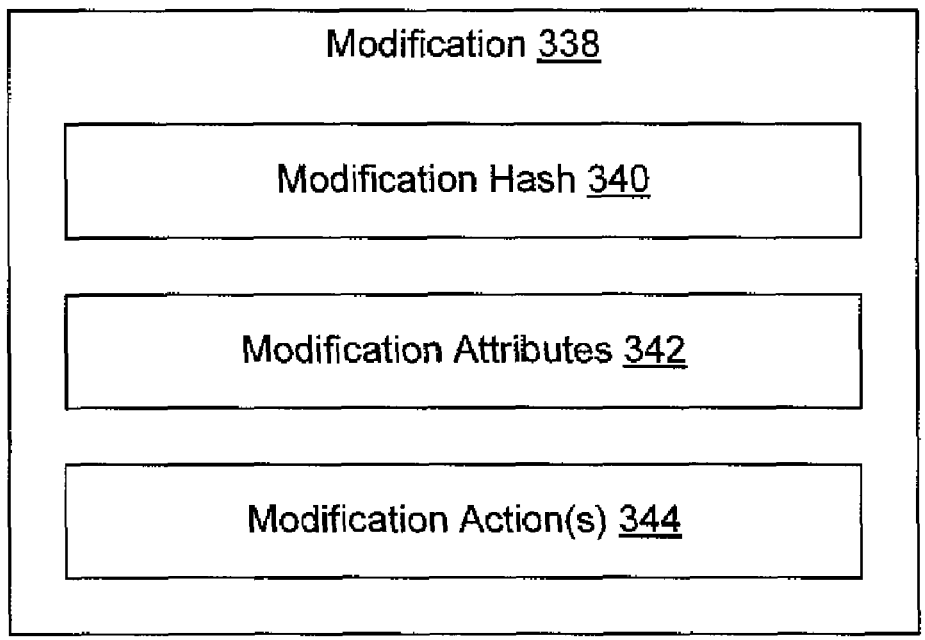

In one embodiment of the invention, a CDF header is created when a source CDF document is created. In another embodiment of the invention, a new CDF header is generated when a target CDF document is created (i.e., after the CTF is applied to the source CDF document). In such cases, the CDF document hash is generated by applying a hash function to the target CDF document (excluding the CDF header, if one is present). Further, in such cases, the CDF header for the target CDF document tracks actions (i.e., modification history) performed on the CDF document (308) after creation of the CDF header (310) for the target CDF document. One embodiment of a modification is shown in FIG. 3F. Those skilled in the art will appreciate that the CDF header (310) may include a listing of all modifications performed on the CDF document (308), where each modification is defined as shown in FIG. 3F.

FIG. 3F shows modification (338) in accordance with embodiment of the invention. In one embodiment of the invention, the modification (338) includes one or more of the following: (i) a modification hash (340) generated by applying a hash function to the CDF document (308) after the modification is performed; (ii) modification attributes (342) define one or more identifying attributes of the modification; and (iii) modification action(s) (344) defines one or more modification actions performed on the CDF document (308), where the modification actions are group together as part of the modification (338). In one embodiment of the invention, the modification hash is encoded using, for example, base 64 encoding, prior to being stored in the modification hash (340) section.

In one embodiment of the invention, after the CDF header (310) is populated with the data described above in FIGS. 3E and 3F, then CDF header (310) is encrypted and subsequently encoded prior to being added to the CDF header (310) section of the CDF document (308). In one embodiment of the invention, the CDF header (310) is serialized, for example, in to an XML string prior to being encrypted. In one embodiment of the invention, the CDF header (310) is encrypted using a symmetric encryption key associated with the CTS. In one embodiment of the invention, the encrypted CDF header is encoded using, for example, base 64 encoding and stored in the CDF document.

The following is an example of an CDF header prior to encryption and encoding in accordance with one embodiment of the invention. The example is not intended to limit the scope of the invention.

EXAMPLE 2

CDF Header

```
<Header xmlns:xsi="http://www.w3.org/2001/XMLSchema-instance"
xmlns:xsd="http://www.w3.org/2001/XMLSchema">
   <ID>123456789</ID>
   <CtsVersion>1.1.6.6</CtsVersion>
   <SerializationPath />
   <GenerationDate>2008-04-23T22:45:51.0809682Z</GenerationDate>
<OriginalHash>945383D2D0A841DBB0A98B0A56EF0FACB3644B085DDE6CB77BCD9FE
A27A7D270EEBFCDEAC7D2BEBD</OriginalHash>
   <Workstation>ECMG-X61</Workstation>
   <UserID>ecmg\ebahr</UserID>
   <ContentSource Name="Local File System">
      <ProviderName>File System Provider</ProviderName>
      <Properties>
         <ProviderProperty>
            <PropertyName>Name</PropertyName>
            <PropertyValue xsi:type="xsd:string">Local File System</PropertyValue>
         </ProviderProperty>
         <ProviderProperty>
            <PropertyName>Provider</PropertyName>
            <PropertyValue xsi:type="xsd:string">File System Provider</PropertyValue>
```

-continued

```
        <ProviderProperty>
        <ProviderProperty>
            <PropertyName>RootPath</PropertyName>
            <PropertyValue xsi:type="xsd:string">My Computer</PropertyValue>
        </ProviderProperty>
        <ProviderProperty>
            <PropertyName>ExportPath</PropertyName>
            <PropertyValue xsi:type="xsd:string">C:\Program Files\ECMG\Content Transformation
Services\Temp\</PropertyValue>
        </ProviderProperty>
        <ProviderProperty>
            <PropertyName>ImportPath</PropertyName>
            <PropertyValue xsi:type="xsd:string">C:\Program Files\ECMG\Content Transformation
Services\Temp\</PropertyValue>
        </ProviderProperty>
        <ProviderProperty>
            <PropertyName>ProviderPath</PropertyName>
            <PropertyValue
xsi:type="xsd:string">F:\ECMG\Volume1\Projects\ECMG\ECMG.CTS.Providers.WindowsFile
System\bin\Ecmg.Cts.Providers.WindowsFileSystem.dll</PropertyValue>
        </ProviderProperty>
    </Properties>
    <ConnectionString>Name=Local File System;Provider=File System Provider;RootPath=My
Computer;ExportPath=C:\Program Files\ECMG\Content Transformation
Services\Temp\;ImportPath=C:\Program Files\ECMG\Content Transformation
Services\Temp\;ProviderPath=F:\ECMG\Volume1\Projects\ECMG\ECMG.CTS.Providers.-
WindowsFileSystem\bin\Ecmg.Cts.Providers.WindowsFileSystem.dll</ConnectionString>
    <ImportPath>C:\Program Files\ECMG\Content Transformation
Services\Temp\</ImportPath>
<ProviderPath>F:\ECMG\Volume1\Projects\ECMG\ECMG.CTS.Providers.WindowsFileSystem
\bin\Ecmg.Cts.Providers.WindowsFileSystem.dll</ProviderPath>
    </ContentSource>
    <Properties>
        <HeaderProperty ID="ValidUntilDate">
            <Type>ecmDate</Type>
            <Cardinality>ecmSingleValued</Cardinality>
            <Name>ValidUntilDate</Name>
            <Value xsi:type="xsd:dateTime">2008-05-23T17:45:51.6069682-05:00</Value>
            <Values />
            <DefaultValue xsi:type="xsd:string" />
            <Mutability>ReadWrite</Mutability>
        </HeaderProperty>
    </Properties>
    <TransformationSeries>
        <TransformationIteration>
<Hash>3697DAD2D165CD6407593D4E270AB1B94A2DDC3A910D472D4855B417D3C58875
</Hash>
            <TransformDate>2008-04-23T22:45:51.3939682Z</TransformDate>
            <Workstation>ECMG-X61</Workstation>
            <UserID>ecmg\ebahr</UserID>
            <Transformation>
                <ExclusionPath>\</ExclusionPath>
                <Exclusions />
                <Actions>
                    <Action xsi:type="ChangePropertyValue">
                        <PropertyName>Folder Path</PropertyName>
                        <PropertyScope>DocumentProperty</PropertyScope>
                        <VersionIndex>0</VersionIndex>
                        <SourceType>DataLookup</SourceType>
                        <DataLookup xsi:type="DataParser">
                            <SourceProperty>
                                <PropertyName>Folder Path</PropertyName>
                                <PropertyScope>DocumentProperty</PropertyScope>
                                <VersionIndex>0</VersionIndex>
                            </SourceProperty>
                            <DestinationProperty>
                                <PropertyName>Folder Path</PropertyName>
                                <PropertyScope>DocumentProperty</PropertyScope>
                                <VersionIndex>0</VersionIndex>
                            </DestinationProperty>
                            <Part>REPLACE:\:/</Part>
                        </DataLookup>
                    </Action>
                    <Action xsi:type="ChangePropertyValue">
                        <PropertyName>FileName</PropertyName>
                        <PropertyScope>VersionProperty</PropertyScope>
                        <VersionIndex>0</VersionIndex>
                        <SourceType>DataLookup</SourceType>
                        <DataLookup xsi:type="DataParser">
```

-continued

```
            <SourceProperty>
               <PropertyName>FileName</PropertyName>
               <PropertyScope>VersionProperty</PropertyScope>
               <VersionIndex>0</VersionIndex>
            </SourceProperty>
            <DestinationProperty>
               <PropertyName>FileName</PropertyName>
               <PropertyScope>VersionProperty</PropertyScope>
               <VersionIndex>0</VersionIndex>
            </DestinationProperty>
            <Part>REMOVE AFTER LAST INSTANCE OF CHARACTER:.</Part>
          </DataLookup>
        </Action>
        <Action xsi:type="RenamePropertyAction">
          <PropertyName>FileName</PropertyName>
          <PropertyScope>VersionProperty</PropertyScope>
          <NewName>DocumentTitle</NewName>
        </Action>
        <Action xsi:type="DeletePropertyAction">
          <PropertyName>Path</PropertyName>
          <PropertyScope>VersionProperty</PropertyScope>
        </Action>
        <Action xsi:type="DeletePropertyAction">
          <PropertyName>DateCreated</PropertyName>
          <PropertyScope>VersionProperty</PropertyScope>
        </Action>
        <Action xsi:type="DeletePropertyAction">
          <PropertyName>DateLastModified</PropertyName>
          <PropertyScope>VersionProperty</PropertyScope>
        </Action>
        <Action xsi:type="DeletePropertyAction">
          <PropertyName>DateLastAccessed</PropertyName>
          <PropertyScope>VersionProperty</PropertyScope>
        </Action>
        <Action xsi:type="DeletePropertyAction">
          <PropertyName>ReadOnly</PropertyName>
          <PropertyScope>VersionProperty</PropertyScope>
        </Action>
        <Action xsi:type="DeletePropertyAction">
          <PropertyName>ObjectID</PropertyName>
          <PropertyScope>DocumentProperty</PropertyScope>
        </Action>
        <Action xsi:nil="true" />
        <Action xsi:type="ChangePropertyValue">
          <PropertyName>Document Class</PropertyName>
          <PropertyScope>DocumentProperty</PropertyScope>
          <PropertyValue xsi:type="xsd:string">Document</PropertyValue>
          <VersionIndex>0</VersionIndex>
          <SourceType>Literal</SourceType>
        </Action>
      </Actions>
    </Transformation>
  </TransformationIteration>
</TransformationSeries>
</Header>
```

The following is an example of an CDF document which includes the encoded/encrypted version of CDF header shown in Example 2 in accordance with one embodiment of the invention. The example is not intended to limit the scope of the invention.

EXAMPLE 3

CDF Document

```
<?xml version="1.0" encoding="utf-8"?>
<Document xmlns:xsi="http://www.w3.org/2001/XMLSchema-instance"
xmlns:xsd="http://www.w3.org/2001/XMLSchema" ID="123456789"
Header="63330D489DC2BB726EE5B142D127051C88AE6F4AC29C429C670D7B4C6D687E
```

-continued

```
03F69BBA9617196773375A2517473292190646D1958A0EFAFFA8A9DE2DBDC834F1FE7B
09203C4F80B022670884D6DE78CA211D8E28E35B8571069405578D344113758AA7EA4C7
AFE55C4292A2160E1BFE1AD92B7409B42CDF3C4E2B003129C8457F175E115730D3D5EB
FA7E5A519AD8F7B8A53C7EB1B376A89DE1FE29C4FF8B6A0F1E978BEA453DD20D9FE
3F913318A02019678A214676C9697F85F7D7654926C9729E2588FD7E5BADB56682A2D54
BDDCDCB441E92557A9781C8BF602C02113315A19E79EF1A54E53486A9F5D9795C11B49
6C1EE6A64C3B4F321BAC01979CDB682FAADBC3B46F309D2D6BD23B2F0CBAF949952
1E9DE8D93301011C5D1F723F42A3D4F23B5643B254C7C2B89ED17A1E0DF52201A00832
029EB394FB12604F9858FF9DD5D0C262FA326C5923EE94011B48052EA16E9EFD1286348
0F8849BD013815461F8A6437F4A87B6FED05E775B87C409FC4C522848673F8C2A2EC481
9CFA0A11DCE6B116225549961E822909E32E26B97FFE769F75B0FDB8E051467D2B8FBB
07434390F91E64060DEC5DA26634567C1DED9F481342CAC87C405E7B8BB7E4E7AD532
B190B9E1870C3E6DB9B76604DE1166599D57CA4538F87398DC849021E8B0979498E9101
5C442295E096CE607B7F6B547463CAC257C8016372354C159D3B8EF0742B08E51438B2A
A6113BB020E7FCB8B5FC265EBDC82986F84040173AECD74BBAA973E41254B3E1E4A3
DA58A5A12FF5A9F12C03572A8C8E417172DBB844B6A2AAACEB1579246308CD54535F
C298984EC7A09493B2893D4AFBE2CC80862814A4456766BB9C9791998F77C52A85AE47
B6C03320C6A247224795AC1DE49AF508034656D4714DFCDA2B1FD2B3A2BEA415A4E2
D6FCB9C0EF0DC21494E09ECB2DF772A1F4BEAF7DB449E3851BA8DB2395806ADA836
C1A8E95AFC42205F41713749D787E59C3998D67C98C915000803B9FD1F9B93DFA1DF9A
ADD5A2AA50973B0A53981E7ACD0E80C059065788BD70DB7E9B77744A8BAD1E83A734
8A7F492DF2E287AA86CFAFBFF3419B7D8158424D889745B12C89965DBE331E3CA1AA1
7DE4DE572578C23DBA05143993888BB6333445FC80F257F3F06726B7E64E533AAABAE5
469A3D7B33CA2ACD639E855D5E4E32AC10688AE0315D04800B15081CD85FE365501FA
BE9FFEC09D87CD73417B76469EB58ED3BE5B5CF5CE9959C58DE6BA3ABDA168142509
AD5B3363B39DC4296A205054DFE6FD78EC9CD97B7812234B414E58ADA812F03CAAE5
9BDB1647DF79B01DE8F48A9D188F4295FF637E6BE3DA7C288BED839C013D7FD93C10
AE77354E1B3D0CBE6A44FA9C850122900546272B3150EFF7D13EAC685CE6BBB99A73C
C2ACD0D84D540D62E77F324A64325D4C8DA51AEACBC88B328AEC06E1E673284EB470
2D6B5E7EAA25AC892E014AE6BF3C5831E04F72B9ED3ADDDA265CF88F735A2F3D1905
D3BA3319E49A985951083C59CD1B15F058F75672DF33719DC05B90F01F69783F7C13DC0
3435D8DA1DCD36F108CC0B1B677784925D400AE7421FDABEA2D52333E074119C1F826
08B9AA37AC6FCA1AC592039770819DDE0B722BF023C624F21BFA08366664B0448CDC4
490B0A7792A5CAB86EDA184917F4FF0A970475BD3B31A72FE090F5BCEE8EE1F34661B
CF2988F71946E41CF1CDA09EC3055B76682105CDA7E13A2630EFE3D1A5FC53BC1DC92
618F93233BDD5EB3F30E3988F8F0E70329430F4753E7665736636C8910E633AD80E165172
685E095E1F12F3107D7BA1B2DB1728D6CA7888EADE80077C93AC823F0EB3C809F8C01
E4138B12B1A807A4413A70811DE4625B419EDD099DB347CA4E2E42DBC328D89C0EF52
CB35E90EEF2DE8DBA9A833CB4217E6028ACE6A47B49B8723B4EEE4FBCBDBBA7F79
D9192DF28615A0A2A156D8C0172B04A6FC8646C5ADE0609D902BA6E3393BA7CB93DC
EA036B37DEF1CEBA72A6E9FC3E8EAC65639D4C5B1A226F47D755AE8C4FC9D419BDC
23CD9D8D53DB127A1075E911A9467643F0209F473D0508A735664E412F433741A2EE5C2
4CF7EC006270AE2E4E1172A9082F8D8A768F3E33435C4C6ED30AACAEC4A956C2EB426
9EF5BD5FCCC22AD7B239A907FB88CB5212796157C2B4F4F4A3EEAEBC49497434CAFE
0FAA1267383CB0DE72319DF39E3A0ABF53AC2960A6536FC6BEF86A4EC3E94E545B9C0
0509F613FB46441C8E4E3F3555274F60BA949645713C46FAEC1CABCABB923A4E30C6D
BF31C1E510D6BF58EBADC0193A0988B92BB6CB96695EF8A9E0CBE09A14A6ECA15CF
01D7F212AB835E992FE2691CC7D50909D19C71427D3258ABA6928001BFB3905AD3DE0
B3C44E469743AB77686EF1B9D795B8016A1A6E5E17A88BECA30A137B953F20B96EC6F
3BB89F04E56ACD2111834AFAA23A8BD7F2A18862BD233437A3B442ACFBAD68DD163
10FCEDB88B4ED4048255D08ECC47DEAE56D310A3CB2B7AE1DA77FC5E0B571239EF5
DCE4DFE8CA200D8DE15053FD78CFB77E33384BBF2C470437F60E487C7B82E35EC231C
96809CD3100C37C2813F7F2D69F4BEEFE041B932D6BAC89257C98D298BC3278F63A139
C1151A09BA40944D5CCECA0D760B925BF54542F61CA61C67BB9E34C014F34CE9B9F6E
C5161C1FD6AA9E81F6C15092097D314B5481DB5692616593C6979BD332F81673905CB8D
55F7249D5C33B14AA3D3A86CF2AF9664C580A43324F9B61FCFE55935A03C8CD4042FF7
21F175B0938A14FD61171DC7ECA5EAB5537A7FA3FFF513735933F97908A363018DE7212
F37EA7B9D0057848BD703EB6FA872C6B7AC6F2C7ABD862A15FE785AE55E6DB14EB69
D10A362944019C82A42CF804087FD1B6DDF482E07FF" CtsVersion="1.1.6.6">
    <Relationships />
    <Properties>
      <ECMProperty ID="Document Class">
        <Type>ecmString</Type>
        <Cardinality>ecmSingleValued</Cardinality>
        <Name>Document Class</Name>
        <Value xsi:type="xsd:string">Document</Value>
        <Values />
        <DefaultValue xsi:type="xsd:string" />
      </ECMProperty>
      <ECMProperty ID="ObjectID">
        <Type>ecmString</Type>
        <Cardinality>ecmSingleValued</Cardinality>
        <Name>ObjectID</Name>
        <Value xsi:type="xsd:string" />
        <Values />
        <DefaultValue xsi:type="xsd:string" />
      </ECMProperty>
    </Properties>
    <Versions>
```

-continued

```
<Version ID="0">
   <Contents>
      <Content
Hash="%C3%B7%C2%A7gT%C3%92%C2%B1%C3%8A%C2%B6%C2%B0%C3%B2%C6%
92%7Bo%C5%B8%09%09%C3%B5!%E2%80%BA%3C">
         <RelativePath>Windows\DirectX.log</RelativePath>
         <ContentPath>C:\Windows\DirectX.log</ContentPath>
         <MIMEType>text/plain</MIMEType>
         <FileSize>
            <Bytes>58569</Bytes>
            <Kilobytes>57.1962890625</Kilobytes>
            <Megabytes>0.055855751037597656</Megabytes>
            <Gigabytes>5.4546631872653961E-05</Gigabytes>
         </FileSize>
         <StorageType>Reference</StorageType>
      </Content>
   </Contents>
   <Properties>
      <ECMProperty ID="canDeclare">
         <Type>ecmBoolean</Type>
         <Cardinality>ecmSingleValued</Cardinality>
         <Name>canDeclare</Name>
         <Value xsi:type="xsd:boolean">true</Value>
         <Values />
         <DefaultValue xsi:type="xsd:string" />
      </ECMProperty>
      <ECMProperty ID="Creator">
         <Type>ecmString</Type>
         <Cardinality>ecmSingleValued</Cardinality>
         <Name>Creator</Name>
         <Value xsi:type="xsd:string">Ebahr</Value>
         <Values />
         <DefaultValue xsi:type="xsd:string" />
      </ECMProperty>
      <ECMProperty ID="CurrentState">
         <Type>ecmString</Type>
         <Cardinality>ecmSingleValued</Cardinality>
         <Name>CurrentState</Name>
         <Value xsi:type="xsd:string">Released</Value>
         <Values />
         <DefaultValue xsi:type="xsd:string" />
      </ECMProperty>
      <ECMProperty ID="RecordInformation">
         <Type>ecmObject</Type>
         <Cardinality>ecmSingleValued</Cardinality>
         <Name>RecordInformation</Name>
         <Value xsi:type="xsd:string" />
         <Values />
         <DefaultValue xsi:type="xsd:string" />
      </ECMProperty>
   </Properties>
</Version>
</Versions>
<DocumentClass>Document</DocumentClass>
<ObjectID />
<StorageType>Reference</StorageType>
</Document>
```

FIG. 3G shows a content transformation file (CTF) (346) in accordance with one embodiment of the invention. In one embodiment of the invention, the CTF (346) defines one or more actions to perform on a source CDF document to generate a target CDF document. In another embodiment of the invention, the CTF (346) defines one or more actions to perform on a SADO to generate a TADO. In one embodiment of the invention, the CTF (346) is an XML file.

In one embodiment of the invention, the CTF (346) may include one or more of the following: (i) CTF attributes (348); (ii) exclusions (350); and action(s) (352). In one embodiment the CTF attributes (348) identify the transformation and/or include information about the XML version used in which the CTF (346) is written. In one embodiment of the invention, the exclusions (350) specify criteria for which one or more NSDs and/or source CDF documents might be excluded from a migration. In one embodiment of the invention, the action(s) (352) specify actions to be performed on the SADOs or source CDF documents to generate TADOs or target CDF documents. The CTF (346) may include an arbitrary number of actions. In one embodiment of the invention, the CTF (346), or more specifically the action(s) (352) defined in the CTF, are generated using the source repository REF and/or the target repository RIF.

The action(s) (352) may include, but are not limited to, one or more of the following: (i) Create Property—defines and creates a new property in the target CDF document or TADO; (ii) Rename Property—renames an existing property in the target CDF document or TADO; (iii) Delete Property—removes a property from the target CDF document or TADO; (iv) Change Property Value—changes the value of an existing property in the target CDF document or TADO; (v) Change Property Cardinality—changes the cardinality of an existing property defined in the SADO or source CDF document; (vi) Change Content Retrieval Name—changes the file name of a content element in the target CDF document or TADO; and (vii) Change Content Mime Type—changes the Multipurpose Internet Mail Extensions (MIME) type of a content element in the target CDF document or TADO.

In one embodiment of the invention, the change property value may include one or more of the following: (i) literal value substitution—sets a value to a hard coded literal value; (ii) a data parser—used to resolve the new value from another property of the document, where the data parser may obtain the value exactly as is or may get the result of parsing operations as defined based on how the user specifies the manner in which the information in the source property is parsed; and (iii) data map—used to resolve the new value from an external data source, such as a database. In one embodiment of the invention, with respect to the data map, in the case where multiple values are returned from the search, the first value may be the value used. In such cases, the value may be filtered based on the value of one or more properties in the source CDF document (or SADO).

The following is an example of a CTF in accordance with one embodiment of the invention. In this example, the CTF defines an action in which the value of DocumentTitle and is used to change the file name for the content associated with the document. The example is not intended to limit the scope of the invention.

EXAMPLE 4

CTF

```
<?xml version="1.0" encoding="utf-8"?>
<Transformation xmlns:xsi="http://www.w3.org/2001/XMLSchema-instance"
xmlns:xsd="http://www.w3.org/2001/XMLSchema">
  <ExclusionPath>\</ExclusionPath>
  <Exclusions />
  <Actions>
    <Action xsi:type="ChangeContentRetrievalName">
      <PropertyName>ContentPath</PropertyName>
      <PropertyScope>VersionProperty</PropertyScope>
      <VersionIndex>0</VersionIndex>
      <SourceType>DataLookup</SourceType>
      <DataLookup xsi:type="DataParser">
        <SourceProperty>
          <PropertyName>DocumentTitle</PropertyName>
          <PropertyScope>VersionProperty</PropertyScope>
          <VersionIndex>0</VersionIndex>
        </SourceProperty>
        <DestinationProperty>
          <PropertyName>ContentPath</PropertyName>
          <PropertyScope>DocumentProperty</PropertyScope>
          <VersionIndex>0</VersionIndex>
        </DestinationProperty>
        <Part>COMPLETE</Part>
      </DataLookup>
    </Action>
    <Action xsi:type="ChangePropertyValue">
      <PropertyName>FileNetClass</PropertyName>
      <PropertyScope>VersionProperty</PropertyScope>
      <VersionIndex>0</VersionIndex>
      <SourceType>DataLookup</SourceType>
      <DataLookup xsi:type="DataMap">
        <ConnectionString>Provider=Microsoft.Jet.OLEDB.4.0;Data
Source=D:\ecmg\Clients\ACME\ACME Table
_Feb8.MDB.mdb;Persist Security Info=False
        </ConnectionString>
        <QueryTarget>ACMEOpsFacDiscCat</QueryTarget>
```

-continued

```
        <SourceColumn>DisciplineCode</SourceColumn>
        <Criteria>
          <Criterion>
            <Name>DocumentCategoryCode</Name>
            <PropertyName>ACMECategory1
            </PropertyName>
            <PropertyScope>VersionProperty</PropertyScope>
            <Operator>opEquals</Operator>
            <SetEvaluation>seAnd</SetEvaluation>
            <Values />
            <Cardinality>ecmMultiValued</Cardinality>
          </Criterion>
          <Criterion>
            <Name>FacilityCode</Name>
            <PropertyName>ACMEFacilityCode</PropertyName
            >
            <PropertyScope>VersionProperty</PropertyScope>
            <Operator>opEquals</Operator>
            <SetEvaluation>seAnd</SetEvaluation>
            <Values />
            <Cardinality>ecmMultiValued</Cardinality>
          </Criterion>
        </Criteria>
      </DataLookup>
    </Action>
  </Actions>
</Transformation>
```

In one embodiment of the invention, the CTS includes functionality to validate the CTF prior to performing a migration. The configuration parameters for the validation are specified in a validation configuration file (VCF). Further, the tests to perform during the validation are defined in a content validation file (CVF).

Figure 3H:
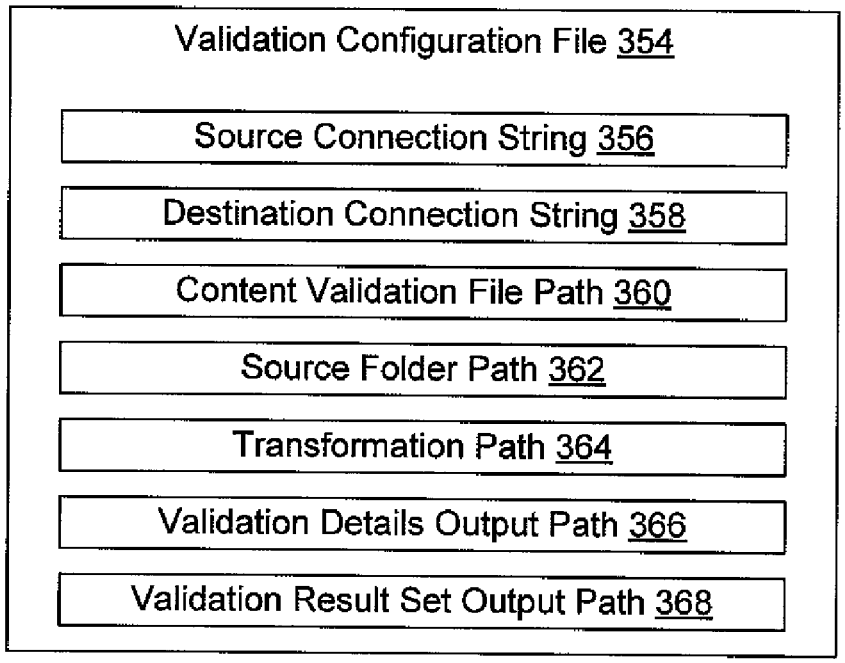

FIG. 3H shows a VCF (354) in accordance with one embodiment of the invention. In one embodiment of the invention, the VCF (354) is an XML file and specifies one or more of the following: (i) SourceConnectionString (356)—the connection string used to instantiate the ContentSource object used for retrieving content from the source document repository; (ii) DestinationConnectionString (358)—the connection string used to instantiate the ContentSource object used for validating information against the target document repository; (iii) Validation FilePath (360)—the fully qualified file name for the CVF containing the validation tests to be run; (iv) SourceFolderPath (362)—the full path name of the source folder containing the content to validate; (v) TransformationPath (364)—the fully qualified file name for the CTF to be used to transform the NSD before validation; (vi) ValidationDetailsOutputPath (366)—the directory path where the validation test result files will be written; (vii) ValidationResultSetOutputPath (368)—the directory path where the validation result set files will be written.

The following is an example of a Validation Configuration File (VCF) in accordance with one embodiment of the invention. The example is not intended to limit the scope of the invention.

EXAMPLE 5

VCF

```
<?xml version="1.0" encoding="utf-8"?>
<ValidationConfiguration xmlns:xsi="http://www.w3.org/2001/XMLSchema-instance"
xmlns:xsd="http://www.w3.org/2001/XMLSchema">
    <SourceConnectionString>Provider=Excel Index Provider;ExportPath=D:\CTS\Excel
    Export;IndexPath=D:\ecmg\Clients\ACME \OCB-SampleData-Load-Abbreviated3-
    022307.xls;IDColumn=ID;MultiValuedPropertyDelimiter=';UserName=;Password=;Provider
    Path=C:\Program Files\ECMG\Content Transformation Services\Providers\Excel
    Index Provider\ECMG.CTS.Providers.Excel.dll</SourceConnectionString>
    <DestinationConnectionString>Provider=Content Engine Web Services 3.5
    Provider;ExportPath=D:\CTS\McLaren
    Export;ImportPath=;P8ContentEngine=servername;WebServicesPort=6070;ObjectStore=
    mclaren;UserName=Administrator;Password=******;CEVersion=3.5;ProviderPath=D:\ecmg\
    Projects\ECMG\ECMG.CTS.Providers.CEWSI35\bin\ECMG.CTS.Providers.CEWSI35
    .dll</DestinationConnectionString>
    <DestinationRIFPath />
    <ValidationFilePath>C:\TestValidation.cvf</ValidationFilePath>
    <CDFSourceDirectory />
    <SourceFolderPath>LoadData-Static</SourceFolderPath>
    <TransformationPath>C:\ecmg\Clients\ACME \Load
    Transformation.ctf</TransformationPath>
    <ValidationDetailsOutputPath>C:\Validations\</ValidationDetailsOutputPath>
    <ValidationResultSetOutputPath>C:\</ValidationResultSetOutputPath>
</ValidationConfiguration>
```

Figure 3I:
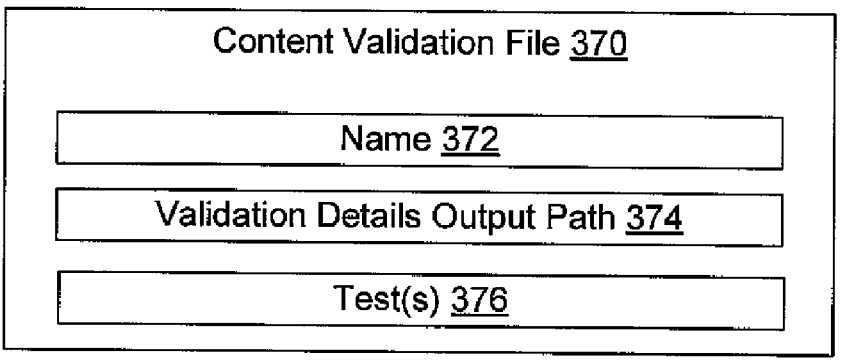

FIG. 3I shows a CVF (370) in accordance with one embodiment of the invention. In one embodiment of the invention, the CVF (370) is an XML file and specifies one or more of the following: (i) name (372)—the name of the CVF; (ii) path (374)—the directory path where the validation test result files will be written; (iii) tests (376)—the group of validation tests to be run. Those skilled in the art will appreciate that each CVF (370) may include one or more validation tests. Further, each validation test may be defined a shown in FIG. 3I. In one embodiment of the invention, the CVF is generated using a RIF of the source document repository and/or a RIF of the target document repository.

Figure 3J:
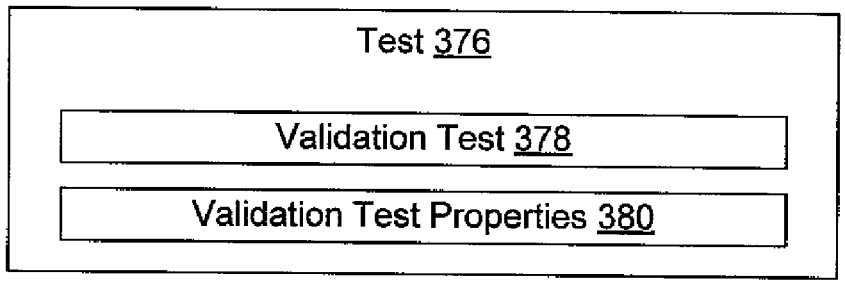

FIG. 3J shows a test (376) in accordance with one embodiment of the invention. The test (376) includes a validation test (378) which defines the test to be performed and validation test properties (380) various properties of the test.

The following is an example of a Content Validation File (CVF) in accordance with one embodiment of the invention. The example is not intended to limit the scope of the invention.

EXAMPLE 6

CVF

```
<?xml version="1.0" encoding="utf-8"?>
<Validation xmlns:xsi="http://www.w3.org/2001/XMLSchema-instance"
xmlns:xsd="http://www.w3.org/2001/XMLSchema"
name="Test Validation" path="C:\Validations\">
    <Tests>
        <!--
        <ValidationTest xsi:type="AllPropertiesValidForDestinationTest"
        name="All Properties Valid For Destination" />
        -->
        <ValidationTest xsi:type="DocumentClassExistsTest"
        name="Correspondence is defined">
            <DocumentClassName>Returns</DocumentClassName>
```

-continued

```
        </ValidationTest>
        <ValidationTest xsi:type="PropertyHasValueTest"
        name="CompanyName has value">
            <TestProperty>
                <Type>ecmString</Type>
                <Cardinality>ecmSingleValued</Cardinality>
                <PropertyScope>VersionProperty</PropertyScope>
                <Name>CompanyName</Name>
                <Value xsi:type="xsd:string"></Value>
                <Values />
            </TestProperty>
            <TestLocation>InDocument</TestLocation>
        </ValidationTest>
        <ValidationTest xsi:type="PropertyHasValueTest"
        name="ReturnSubClass has value">
            <TestProperty>
                <Type>ecmString</Type>
                <Cardinality>ecmSingleValued</Cardinality>
                <PropertyScope>VersionProperty</PropertyScope>
                <Name>ReturnSubClass</Name>
                <Value xsi:type="xsd:string"></Value>
                <Values />
            </TestProperty>
            <TestLocation>InDocument</TestLocation>
        </ValidationTest>
    </Tests>
</Validation>
```

Those skilled in the art will appreciate that while embodiments of the invention are described with respect to XML any language may be used to represent one or more of the various data structures defined above.

Figure 4:
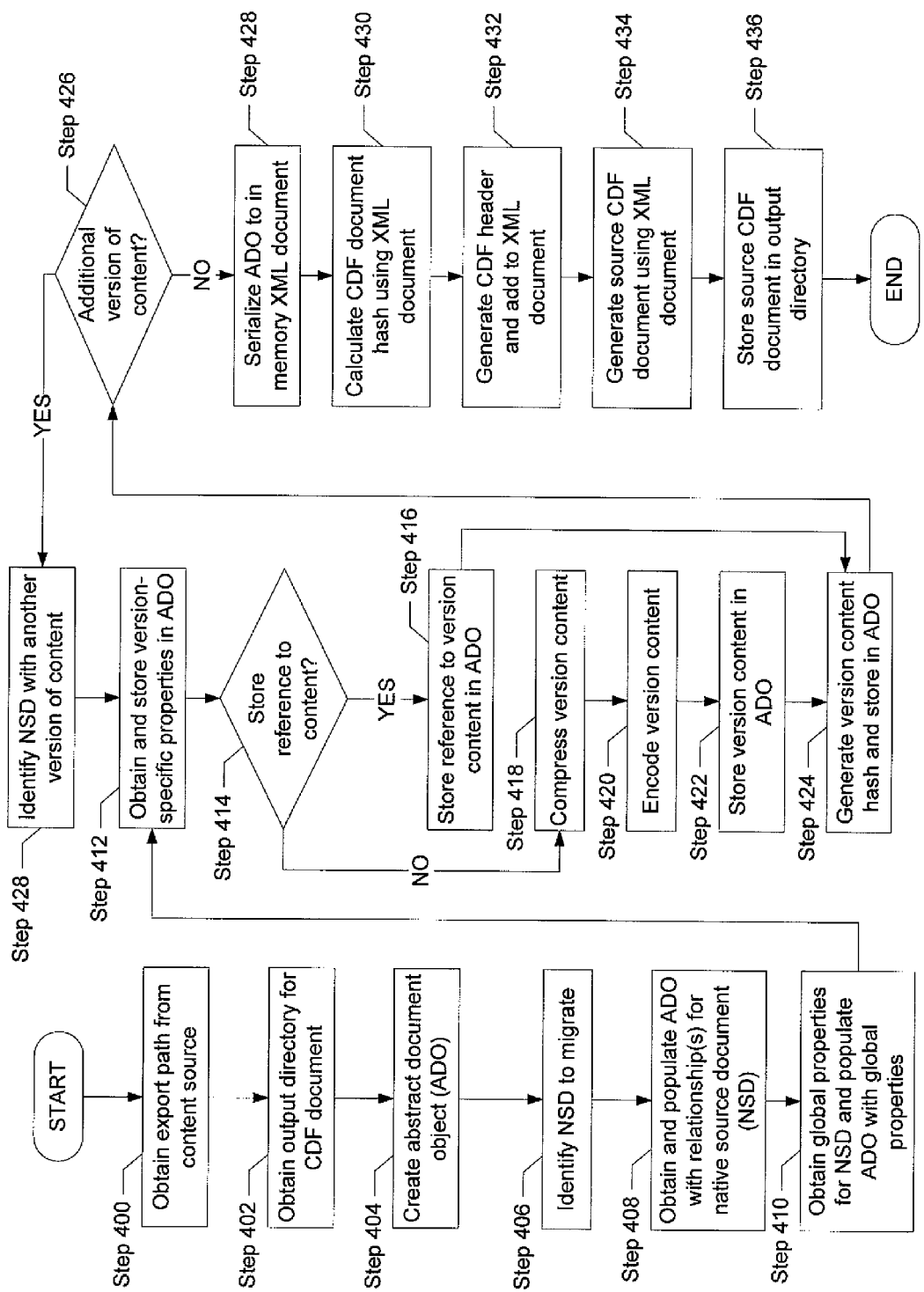
FIGS. 4-6 show flow charts in accordance with one embodiment of the invention.
Figure 5:
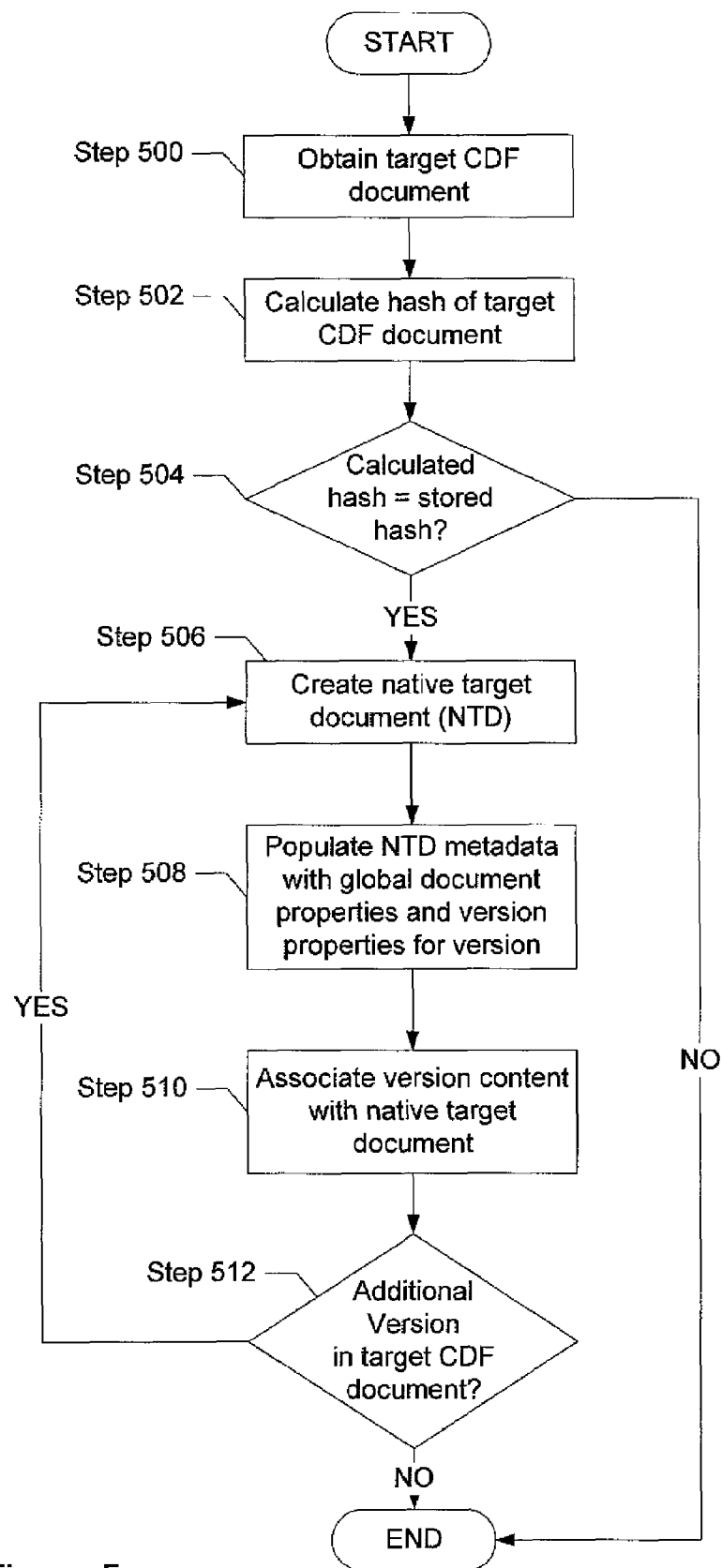
Figure 6:
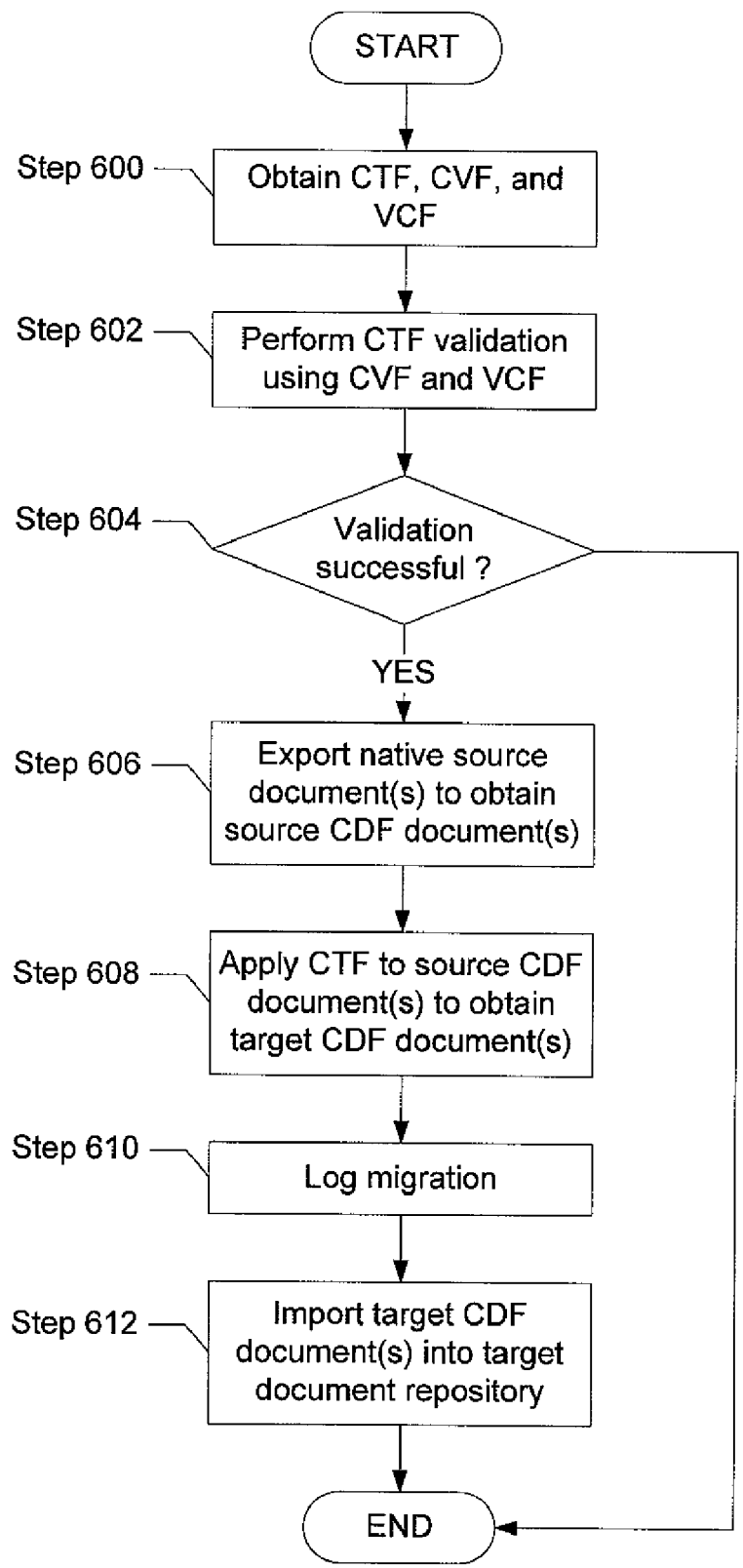

Using the above data structures, the CTS may perform one or more of the following methods shown in FIGS. 4-6. More specifically, FIGS. 4-6 show methods in accordance with one embodiment of the invention. In one or more embodiments of the invention, one or more of the steps shown in FIGS. 4-6 may be omitted, repeated, and/or performed in a different order. Accordingly, embodiments of the invention should not be considered limited to the specific arrangement of steps shown in FIGS. 4-6.

Turning to FIG. 4, FIG. 4 shows a method for exporting native source documents (NSDs) in accordance with one embodiment of the invention. In step 400, the export path is obtained from the content source (i.e., the location of the documents in the source document repository is obtained). In step 402, the output directory for the CDF documents is obtained. In one embodiment of the invention, the output directory is obtained from the content source. In step 404, an abstract document object (ADO) is created. In one embodiment of the invention, creating the ADO involves creating an in-memory data structure, which may be subsequently populated.

In step 406, the NSD to export is identified. In one embodiment of the invention, the NSD includes content and metadata. In step the 408, the relationship(s) for the NSD to export is obtained and used to populate the appropriate portions of the ADO. In step 410, the global properties for the NSD are obtained and used to populate the appropriate portions of the ADO. In embodiment of the invention, obtaining the global properties includes extracting various information from the metadata associated with the NSD identified in step 406. In step 412, the version-specific properties for the content associated with the identified NSD are obtained.

In step 414, a determination is made about whether to store a reference to the content. If the reference to the content is to be stored, then the process proceeds to step 416. Alternatively, the process proceeds to step 418. In step 416, the reference to the content (e.g., the fully qualified pathname content) is stored. The process then proceeds to step 424. In step 418, the content may be optionally compressed. In step 420, the content (or a compressed version of the content) is encoded, for example, using base 64 encoding. In step 422, the encoded version of the content (or encoded compressed version of the content) is stored in the ADO. In step 424, the version content hash is generated and stored in the ADO. In one embodiment of the invention, the content is encoded using, for example, base 64 encoding, prior to being input in to a hash function.

In step 426, a determination is made about whether there are additional versions of the content (i.e., additional versions of the content associated with the NSD identified in step 406) in the source document repository. In step 428, if there are additional versions of content, an NSD with another version of the content is obtained from the source document repository and the process proceeds to step 412.

In step 430, once all versions of the content have been analyzed and the appropriate metadata and/or content is placed in the ADO, the ADO is serialized to obtain an in-memory XML document. In step 432, the CDF document hash is generated by applying a hash function to the XML document. In Step 434, the CDF header is generated, where the CDF header includes the CDF document hash. The CDF header is subsequently added to the XML document. In step 436, the source CDF document is generated from the XML document. In step 438, the source CDF document is stored in the output directory specified in step 402. In one embodiment of the invention, if the source CDF document includes references to the versions of the content, then the source CDF document is stored in a folder within the output directory and the individual versions of the content are each stored in separate sub-folders of the folder.

Those skilled in the art will appreciate that while FIG. 4 describes the generation of the CDF Header in a single step (i.e., step 434), the CDF header may be generated concurrently with the other portions of the source CDF document. Those skilled in the art will appreciate that while the FIG. 4 describes processing one NSD and then locating another NSD with another version of content, the method shown in FIG. 4 may be modified to initially identify all NSDs with a version of the content and then process all of the identified NSDs.

FIG. 5 shows a method for importing target CDF document in accordance with one embodiment of the invention. In step 500, the target CDF document to import is obtained. In step 502, the hash of the CDF document (excluding the CDF header) is calculated. In step 504, a determination is made about whether the hash calculated in step 502 is equal to the hash stored in the CDF header of the target CDF document. If the hash calculated in step 502 is equal to the hash stored in the CDF header of the target CDF document, then the process proceeds to step 506. Alternatively, the process terminates if the hash calculated in step 502 is not equal to the hash stored in the CDF header of the target CDF document.

In step 506, a native target document (NTD) is created. In step 508, the NTD metadata is populated with global document properties and version-specific properties for the first version of the content. The aforementioned properties are obtained from the target CDF document. In step 510, the NTD is associated with the first version of the content. In step 512, a determination is made about whether the target CDF document references or includes other versions of the content. If the target CDF document references or includes other versions of the content, the process proceeds to step 506 Once all the versions of the content referenced or included in the target CDF document are processed the method ends.

FIG. 6 shows a method for migrating documents from a source document repository to target document repository. In step 600, the content transformation file (CTF), the validation configuration file (VCF), and the content validation file (CVF) are obtained. In one embodiment of the invention, the CTF includes the transformation(s) required to transform the source CDF document into a target CDF document. In step 602, the CTF is validated using the CVF and the VCF. In step 604, a determination is made about whether the validation is successful. If the validation is successful, then the process proceeds to step 606. In the validation is not successful, the process ends.

In step 606, native source documents (NSDs) are exported to obtain source CDF documents (as described in FIG. 4). In one embodiment of the invention, the source CDF documents are stored in a persistent storage device. In step 608, the CTF is applied to the source CDF documents to obtain target CDF documents. In step 610, the migration process is optionally logged. In one embodiment of the invention, logging the migration process includes providing an indication when each source CDF document has been successfully transformed in to a target CDF document. In step 612, the target CDF document is imported in the target document repository (as discussed in FIG. 5).

Those skilled in the art will appreciate that while FIG. 6 shows a single step of logging the migration, the migration may be logged at any point or at multiple points during the migration process. Those skilled in the art will appreciate that while FIG. 6 describes asynchronous migration, the migration process may be performed synchronously. In such cases, the export process generates SADOs and the CTF is applied to the SADOs to generate TADOs. The TADOs are subsequently imported into the target document repository.

In one embodiment of the invention, the CTS includes a graphical user interface (GUI) (not shown) to display one or more of the files discussed above (e.g., CDF documents, VCF, VCF, migration log, CTF, etc.) In addition, the GUI enables a user to perform one or more of the methods described in FIGS. 4-6.

Figure 7:
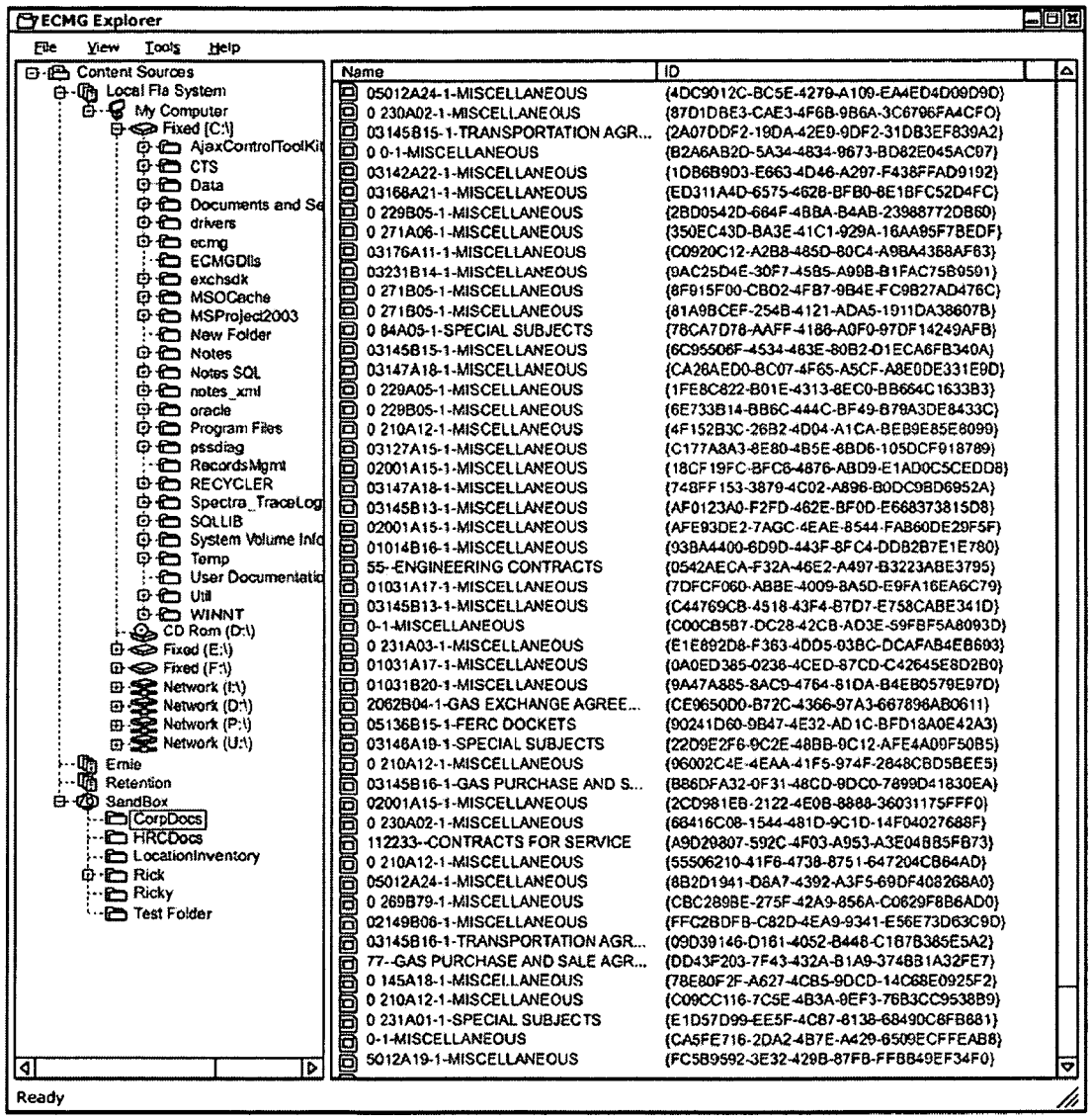
Figure 8:
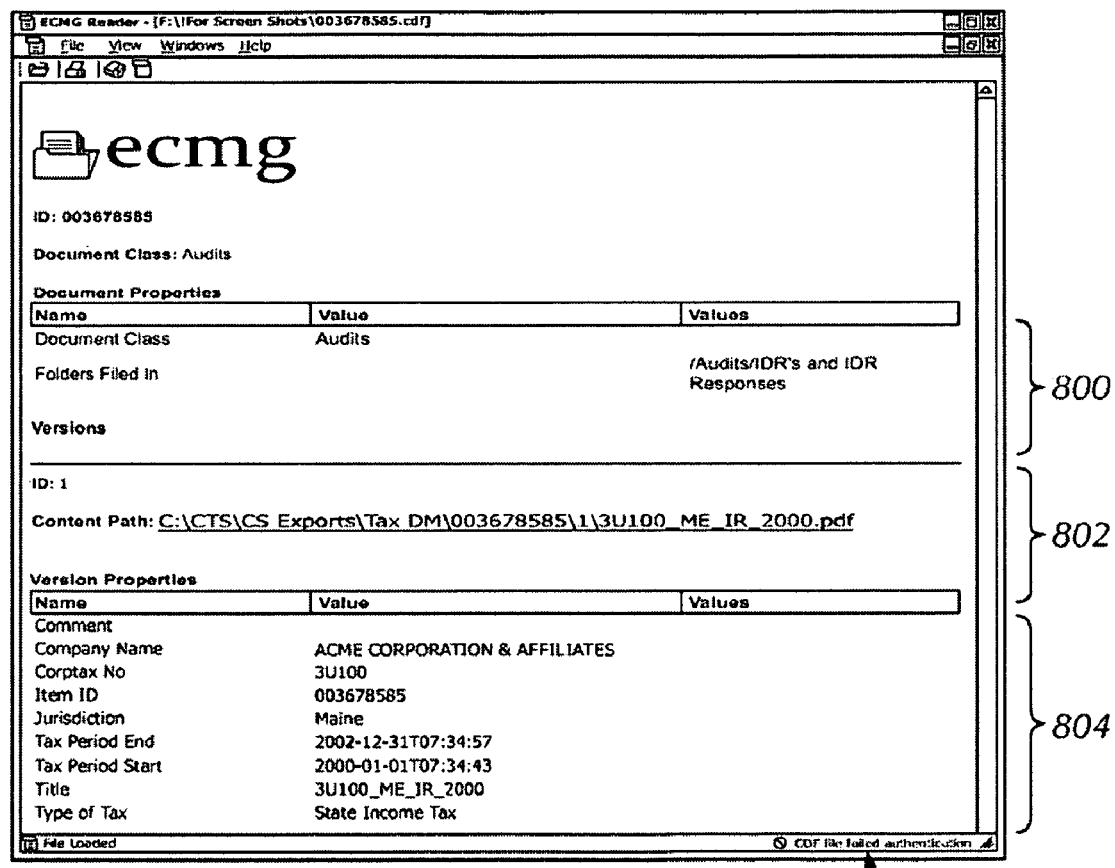

The following figures show screenshots of the GUI in accordance with one embodiment of the invention. More specifically, FIG. 7 shows screenshot in accordance with one embodiment of the invention. The screenshot in FIG. 7 shows that a four content sources currently available for importing, exporting, viewing, and/or analyzing. The content sources shown in FIG. 7 are (i) Local File System (ii) Ernie; (iii) Retention; and (iv) SandBox. FIG. 8 shows screenshot of a CDF in accordance with one embodiment of the invention. The screenshot in FIG. 8 shows a representation of a CDF document in the GUI provided by the CTS. As shown in FIG. 8, the GUI displays the global properties (800), a reference to the content (802), and version properties for the referenced content (804). In addition, the screenshot shows that the authentication of the displayed CDF file failed (i.e., the CDF hash stored in the CDF document header is not equal to the CDF hash calculated for the CDF document at the time the CDF document was accessed for display in the GUI).

Figure 9:
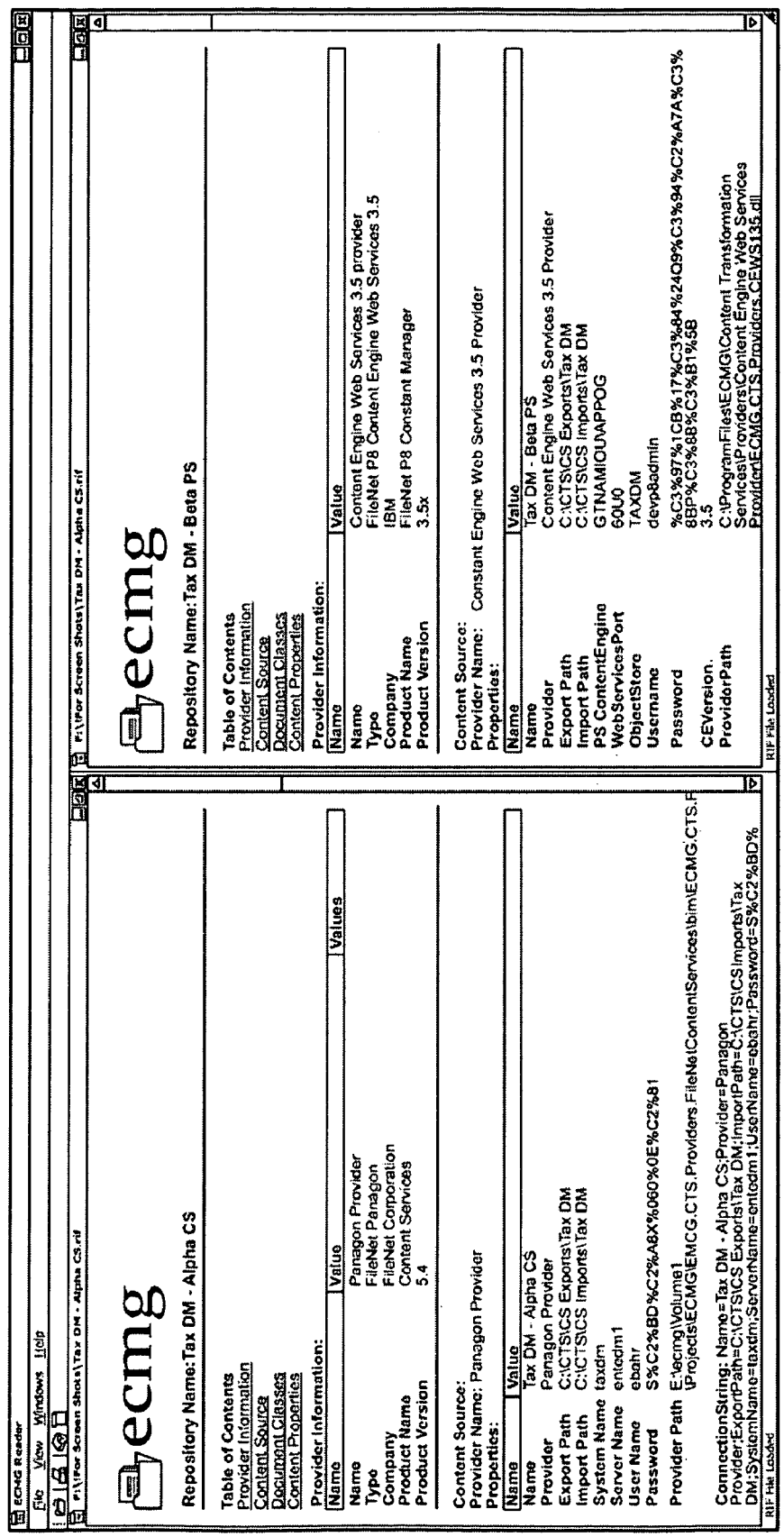
Figure 10:
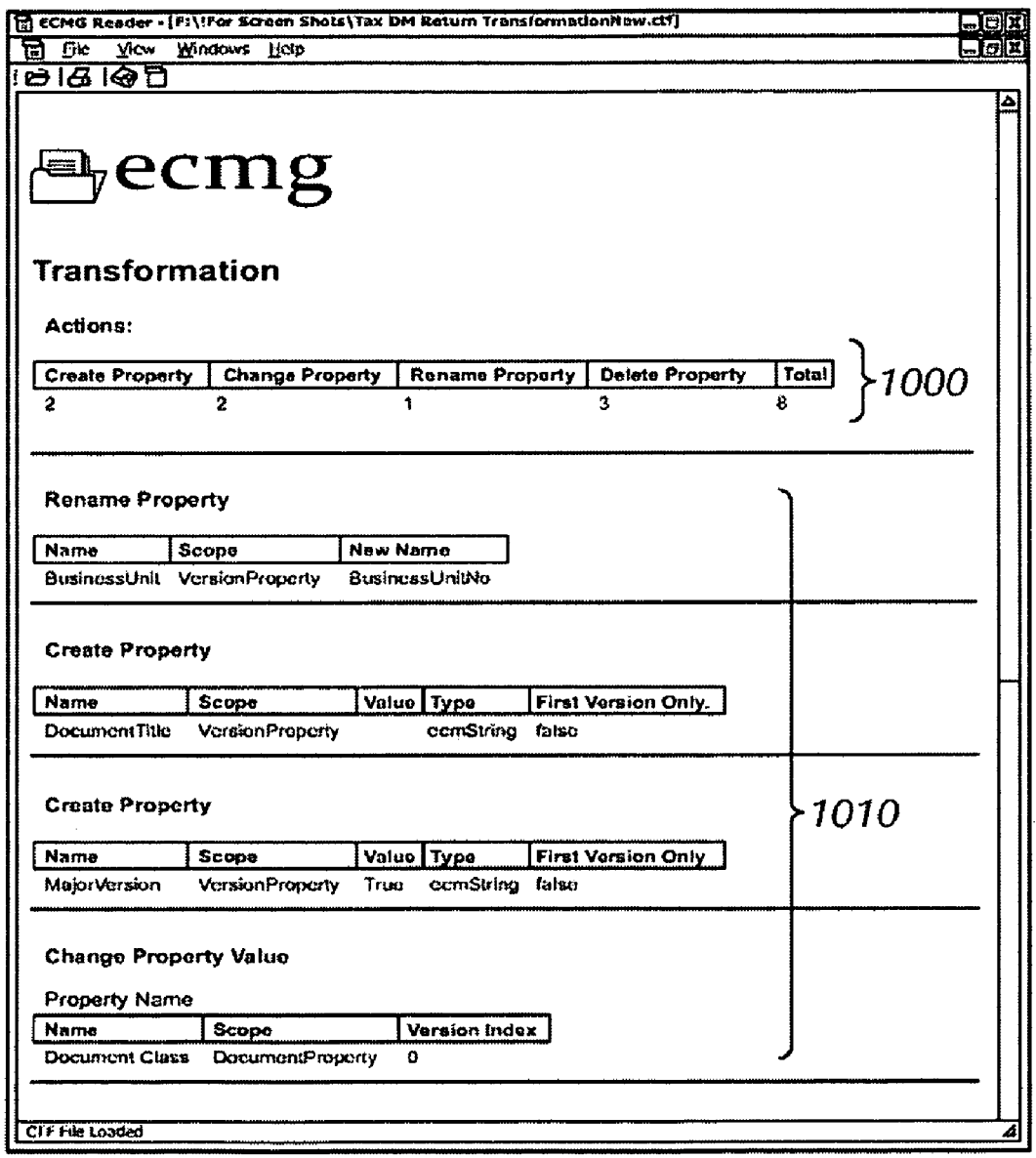

FIG. 9 shows a screenshot of RIFs in accordance with one embodiment of the invention. FIG. 10 shows a screenshot of a CTF in accordance with one embodiment of the invention. The CTF, as displayed, includes eight actions (1000) as well as a listing of the actions (1010). FIG. 11 shows a screenshot of validation results in accordance with one embodiment of the invention. The validation result set summary (1100) indicates that 340 total tests were performed and all tests were successful. Further, the screenshot shows a listing of the individual NSDs that were tested (1110).

Figure 12:
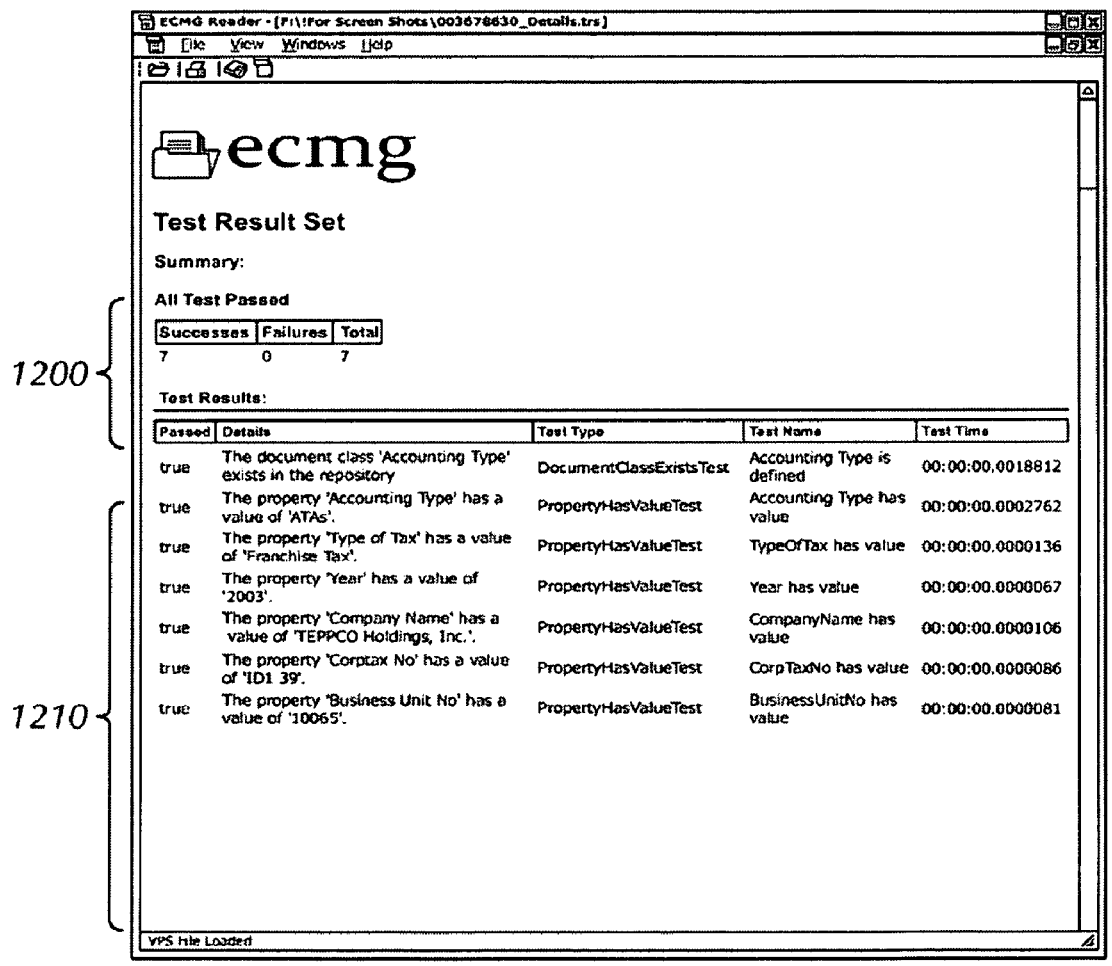

FIG. 12 shows test results for one of the NSDs tested in accordance with one embodiment of the invention. Specifically, the test result set shows the test results for NSD 003678630 (listed in FIG. 11 under the "All Test Results" heading). The test result set indicates that seven tests were performed and passed (1200). Further, the test results set provides details for each of the seven tests (1210).

Figure 13:
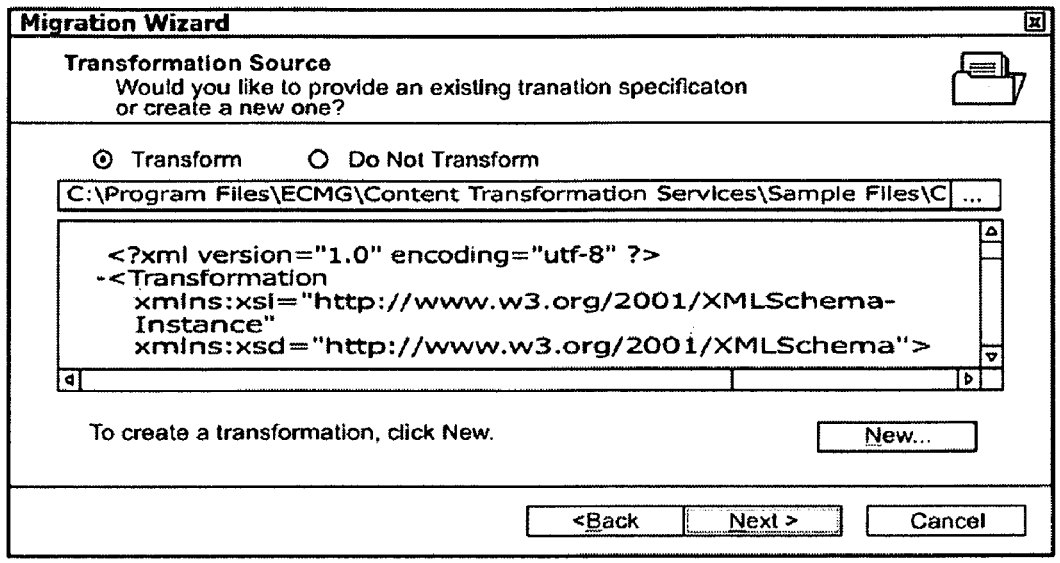
Figure 14:
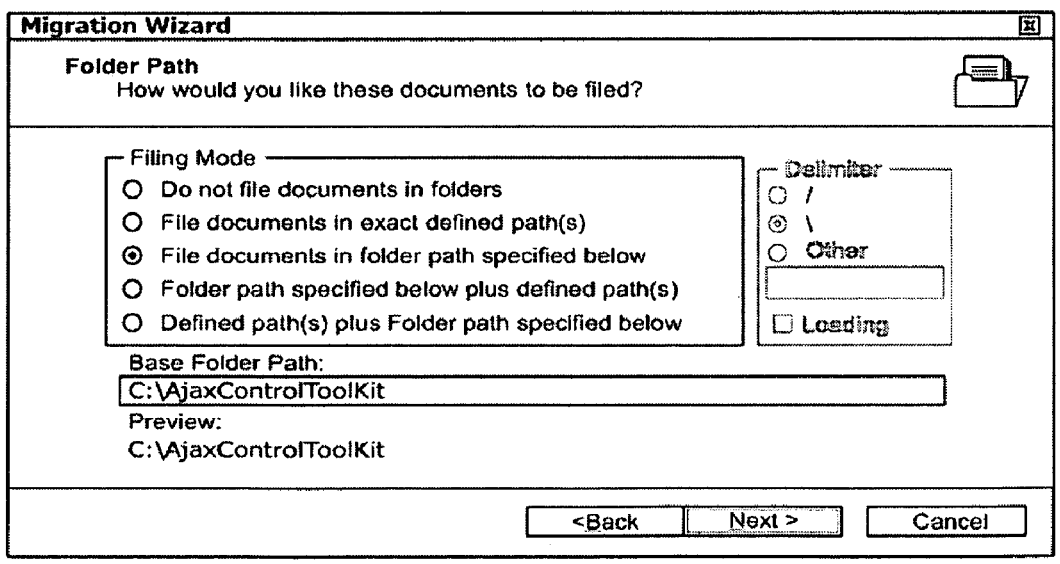

FIGS. 13-16 show screenshots for configuring and performing a migration. Specifically, FIG. 13 shows a screenshot of a GUI for creating a CTF in accordance with one embodiment of the invention. FIG. 14 shows a screenshot of a GUI for specifying the output directory for the CDF documents after they have been transformed in accordance with one embodiment of the invention.

Figures 15, 16:
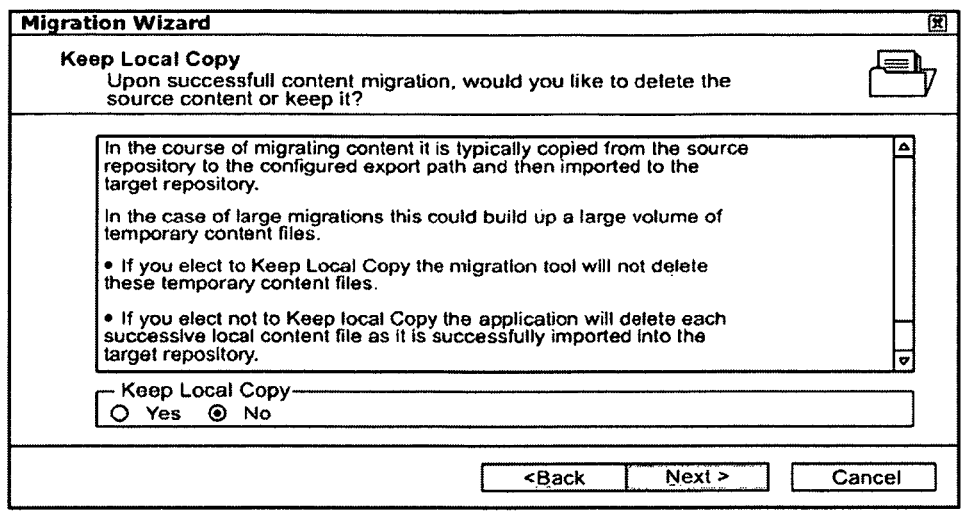

FIG. 15 shows screenshot of a GUI in accordance with one embodiment of the invention. Specifically, the GUI allows the user to decide whether or not the content and CDF documents generated in the course of the migration are saved or deleted. In large migrations, the decision to not Keep Local Copy may improve performance as well as save valuable disc space on the migration workstation.

FIG. 16 show screenshot of a migration log in accordance with one embodiment of the invention. Specifically, the migration log includes a summary of the migration (1600) which reflects the total NSDs involved in the migration as well as how many of the NSDs were successfully and unsuccessfully migrated. Further, the migration log includes a listing of the NSDs which failed to migrate as well as the details about why they failed to migration (1610). Finally, the migration log includes a listing of all NSDs involved in the migration as well as detail about whether they were successfully or unsuccessfully migrated (1620).

The invention (or portions thereof), may be implemented on virtually any type of system regardless of the platform being used. For example, the system may include a processor, associated memory, a storage device, and numerous other elements and functionalities typical of today's computers (not shown). The system may also include input means, such as a keyboard and a mouse, and output means, such as a monitor. The system is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned system may be located at a remote location and connected to the other elements over a network. Further, the invention may be implemented on a distributed system having a plurality of nodes, where each portion of the invention may be located on a different node within the distributed system. In one embodiment of the invention, the node corresponds to a system. Alternatively, the node may correspond to a processor with associated physical memory. The node may alternatively correspond to a processor with shared memory and/or resources. Further, software instructions to perform embodiments of the invention may be stored on a non-transitory computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor perform a method for exporting native source documents (NSDs) from a document repository, the method comprising:
   identifying a first NSD to export, wherein the first NSD comprises a first version of content and first metadata;
   identifying a second NSD to export, wherein the second NSD comprises a second version of the content and second metadata;
   generating a source content definition file (CDF) document comprising:
   a global property, wherein the global property is present in the first metadata,
   a first version-specific property for the first version of the content, wherein the first version-specific property is obtained from the first metadata,
   a reference to the first version of the content,
   a second version specific-property for the second version of the content, wherein the second version-specific property is obtained from the second metadata,
   a first hash of the first version of the content,
   a second hash of the second version of the content, and
   a reference to the second version of the content; and
   storing the source CDF document in a persistent storage device, wherein the source CDF document is an Extensible Mark-up Language (XML) document.

2. The non-transitory computer readable medium of claim 1, further comprising:
   generating a CDF document hash by applying a hash function to the source CDF document; and
   generating a CDF header comprising the CDF document hash, wherein the CDF header is stored within the source CDF document after the CDF document hash is generated.

3. The non-transitory computer readable medium of claim 2, wherein the CDF header comprises:
   a CDF document usage restriction defining at least one usage restriction for the source CDF document.

4. The non-transitory computer readable medium of claim 2, wherein the CDF header comprises:
a modification history comprising:
an action performed on the source CDF document after the source CDF was created, and
a modification hash generated by applying a hash to the source CDF document after the action is performed.

5. The non-transitory computer readable medium of claim 1, wherein persistent storage device is a hard disk drive.

6. The non-transitory computer readable medium of claim 1, wherein the source CDF document further comprises:
a relationship property defining a relationship between the first NSD and a third NSD in the document repository.

7. A non-transitory computer readable medium comprising instructions, which when executed by a processor perform a method for migrating native source documents (NSDs) from a first document repository to a second document repository, the comprising:
identifying a first NSD to export, wherein the first NSD comprises a first version of content and first metadata;
identifying a second NSD to export, wherein the second NSD comprises a second version of the content and second metadata;
generating a source CDF document, wherein the source CDF document comprises:
a global property, wherein the global property is present in the first metadata,
a first version-specific property for the first version of the content, wherein the first version-specific property is obtained from the first metadata,
an encoded version of the first version of the content,
a second version-specific property for the second version of the content, wherein the second version-specific property is obtained from the second metadata, and
an encoded version of the second version of the content;
storing the source CDF document in a persistent storage device, wherein the source CDF document is an Extensible Mark-up Language (XML) document;
obtaining a content transformation file (CTF) defining how to transform the source CDF document into a target CDF document;
transforming the source CDF document into a target CDF document using the CTF; and
generating a first native target document (NTD) comprising the first version of the content from the target CDF file;
generating a second native target document (NTD) comprising the second version of the content from the target CDF file;
storing the first NTD in the second document repository; and
storing the second NTD in the second document repository.

8. The non-transitory computer readable medium of claim 7, wherein the global property is associated with the first and second NTD, wherein the first version-specific property is associated with the first NTD and the second version-specific property is associated with the second NTD.

9. The non-transitory computer readable medium of claim 7, wherein the first document repository is defined by a repository information file (RIF), wherein the RIF comprises a repository property identifying the first repository, a provider property defining how to interact with the first repository, and a list of document classes supported by the first repository.

10. The non-transitory computer readable medium of claim 9, wherein the CTF is generated using the RIF.

11. The non-transitory computer readable medium of claim 9, wherein the CTF is validated using a content validation file (CVF) prior to transforming the source CDF document into the target CDF document.

12. The non-transitory computer readable medium of claim 9, wherein the target CDF document is associated with a CDF header and wherein the CDF header is verified prior to generating the first NTD.

13. The non-transitory computer readable medium of claim 12, wherein the CDF header comprises a CDF document hash obtained by applying a hash function to the target CDF document upon creation of the target CDF document and wherein the verifying the CDF header comprises comparing the CDF document hash in the CDF header with the result of applying the hash function to the target CDF document prior to generating the first NTD.

14. The non-transitory computer readable medium of claim 7, wherein the target CDF document is validated using a content validation file (CVF).

15. The non-transitory computer readable medium of claim 7, wherein transforming the source CDF document to obtain the target CDF document comprises transforming based on the CTF at least one selected from a group consisting of a name of the global property, the value of the global property, a name of the first version-specific property, a value of the first version-specific property, and a name of the second version-specific property, and a value of the second version-specific property.

16. The non-transitory computer readable medium of claim 7, wherein the first document repository and the second document repository are instances of the same type of document repository.

17. A non-transitory computer readable medium comprising instructions, which when executed by a processor perform a method for migrating a native source document (NSD) from a first document repository to a second document repository, the method comprising:
identifying the NSD to export, wherein the NSD comprises a first version of content, a second version of the content, and metadata;
generating a source CDF document, wherein the source CDF document comprises:
a global property, wherein the global property is present in the metadata,
a first version-specific property for the first version of the content, wherein the first version-specific property is obtained from the metadata,
a reference to the first version of the content,
a second version-specific property for the second version of the content, wherein the second version-specific property is obtained from the metadata, and
a reference to the second version of the content;
storing the source CDF document in a persistent storage device, wherein the source CDF document is an Extensible Mark-up Language (XML) document;
obtaining a content transformation file (CTF) defining how to transform the source CDF document into a target CDF;
transforming the source CDF document into a target CDF document using the CTF; and
generating a first native target document (NTD) comprising the first version of the content from the target CDF file;
generating a second native target document (NTD) comprising the second version of the content from the target CDF file;
storing the first NTD in the second document repository; and
storing the second NTD in the second document repository.

* * * * *